US012626708B1

(12) United States Patent
George et al.

(10) Patent No.: US 12,626,708 B1
(45) Date of Patent: May 12, 2026

(54) HYBRID SPECTRO-MORSE ACOUSTIC AUTHENTICATION SYSTEM AND METHOD

(71) Applicant: both Inc., Middletown, DE (US)

(72) Inventors: Mulakkal Thomas George, Dubai (AE); Bosky Cherin Varghese, Dubai (AE); Senthil Kumar Muthian, Dubai (AE)

(73) Assignee: both Inc., Middletown, DE (US)

( * ) Notice: Subject to any disclaimer, the term of this patent is extended or adjusted under 35 U.S.C. 154(b) by 0 days.

(21) Appl. No.: 19/314,667

(22) Filed: Aug. 29, 2025

(51) Int. Cl.
| | |
|---|---|
| *G10L 19/018* | (2013.01) |
| *H04L 9/08* | (2006.01) |
| *H04L 9/32* | (2006.01) |

(52) U.S. Cl.
CPC ............ *G10L 19/018* (2013.01); *H04L 9/085* (2013.01); *H04L 9/32* (2013.01)

(58) Field of Classification Search
CPC .......... G10L 19/018; H04L 9/085; H04L 9/32
See application file for complete search history.

(56) References Cited

U.S. PATENT DOCUMENTS

| | | | |
|---|---|---|---|
| 9,317,872 B2 | 4/2016 | Courtney, III et al. | |
| 9,942,602 B2 | 4/2018 | Petrovic et al. | |
| 10,777,210 B2 | 9/2020 | Garcia | |
| 10,964,332 B2 | 3/2021 | Gautama | |
| 11,477,156 B2 | 10/2022 | Lord | |
| 12,244,844 B2 * | 3/2025 | Loyd ....................... | G06F 16/29 |

| | | | |
|---|---|---|---|
| 2010/0223223 A1 * | 9/2010 | Sandler ................. | G06F 16/683 |
| | | | 706/50 |
| 2012/0134238 A1 * | 5/2012 | Surprenant ............ | H04S 1/007 |
| | | | 367/137 |
| 2012/0203363 A1 | 8/2012 | Mckenna et al. | |
| 2014/0114456 A1 * | 4/2014 | Stavropoulos ......... | H04H 60/40 |
| | | | 700/94 |
| 2015/0043748 A1 * | 2/2015 | Sudo ...................... | H04R 17/00 |
| | | | 381/102 |
| 2016/0261997 A1 * | 9/2016 | Gladstone ............. | H04W 4/029 |
| 2018/0137458 A1 * | 5/2018 | Repensek .............. | G06Q 30/04 |
| 2023/0370657 A1 * | 11/2023 | Van De Pol ....... | H04N 21/8541 |
| 2024/0127833 A1 | 4/2024 | Goshen et al. | |
| 2024/0362738 A1 | 10/2024 | Alattar et al. | |
| 2025/0165908 A1 * | 5/2025 | Goller ................. | G06Q 10/087 |

* cited by examiner

*Primary Examiner* — Oleg Korsak
(74) *Attorney, Agent, or Firm* — Neo IP

(57) ABSTRACT

An audio authentication and identity verification system and method that encodes dynamic cryptographic information across the audible and inaudible spectrum (0 Hz→30 kHz, scalable to 124 kHz). A rolling acoustic signature simultaneously embeds identity, time, date, and GPS location using a hybrid of frequency shift keying (FSK), phase shift keying (PSK), Morse style pulse duration modulation, and time domain multiplexing. To guarantee post-event privacy and integrity, the system further incorporates a dual custody audio architecture in which every authenticated recording is split into complementary bit interleaved segments stored separately, and the decryption key is fragmented via Shamir 3-of-5 secret sharing—preventing unilateral access or tampering. The system establishes a tamper proof, real time, and offline capable authentication layer that functions in air, through conventional microphones, and via dedicated emitter hardware.

15 Claims, 12 Drawing Sheets

108

Playing audio content

Emitting an inaudible audio signature

Module the inaudible audio signature

Encoding the inaudible audio signature with the audio content

Decode the audio signature

Authenticate the audio content through verification of the audio signature

110

Obtain/receive audio content

Acquire ID, time, date, GPS coordinates

Hash identity encoding

Pulse-duration framing

Modulate: FSK + PSK

Emit in ultrasonic band
Persist signature WAV (≥96 kHz)

112

Capture audio content for verification

Band-pass (ultrasonic)

Time-frequency analysis

De-frame

Extract fields of the signature: ID, time, date, GPS coordinates

Validate: signature + continuity

Attestation record

120

Payload Formation
VERFLAGS|ID64|UTC30|LOC35|CRC16

FEC Encode

Radix-36 Packing
28B → 44 digits

Cryptographic Interleaver
ChaCha20-driven FY

Lane Hopping
L0 from Hash (ID, UTC, LOC)

Glyph Mapping
36 SpectroGlyphs

Pilot Insertion
Bawrker-13 BPSK

Framing
MF = 1s, SF = 2s

Emission
Normalize level; mix or silent

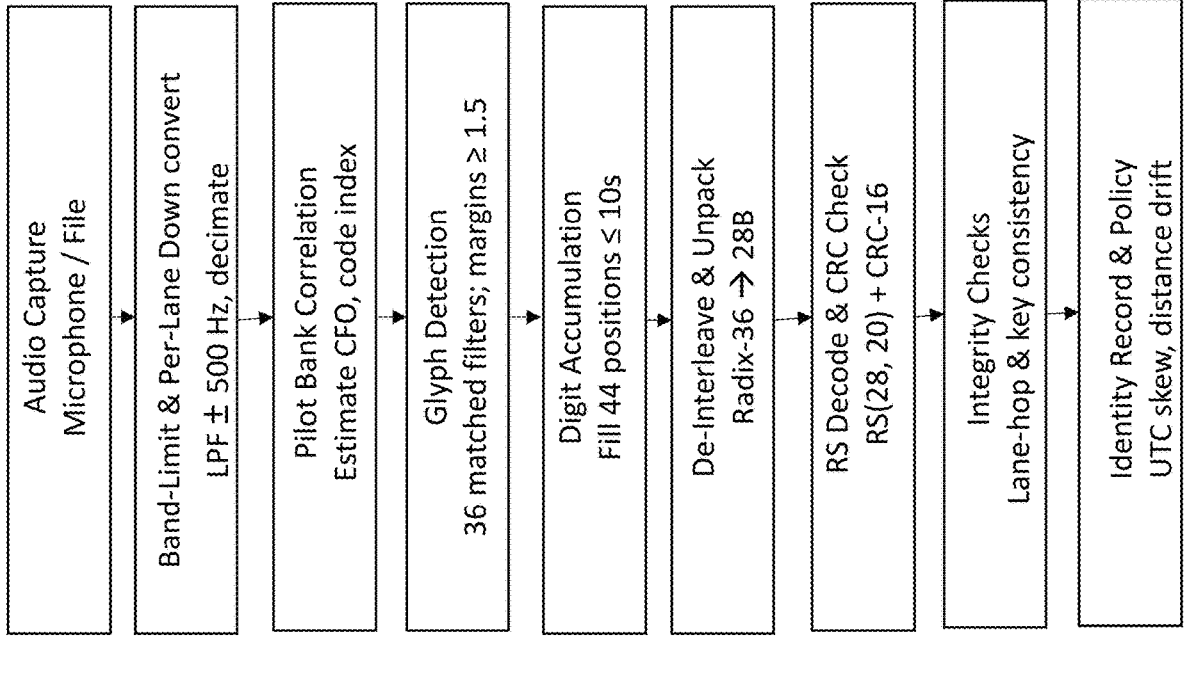

122

Audio Capture
Microphone / File

Band-Limit & Per-Lane Down convert
LPF ± 500 Hz, decimate

Pilot Bank Correlation
Estimate CFO, code index

Glyph Detection
36 matched filters; margins ≥ 1.5

Digit Accumulation
Fill 44 positions ≤ 10s

De-Interleave & Unpack
Radix-36 → 28B

RS Decode & CRC Check
RS(28, 20) + CRC-16

Integrity Checks
Lane-hop & key consistency

Identity Record & Policy
UTC skew, distance drift

RFS Payload (20B):
VERFLAGS (AUX=1) | ID64 | UTC30 | LOC35 | CRC16
→ RS(28, 20) → Interleave → Emit Next Superframe AUX (20B):
AUX_TYPE | AUX_VER | SUBJECT(4B)
EXPIRY(4B) | DIGEST10(10B)
→ RS(28, 20) → Interleave → Emit Acoustic Decode
AUX fields recovered Match DIGEST10 →
Locate signed ACT Verify ACT signature
(Ed25519)
Check EXPIRY/valid_to
Evaluate age ≥ threshold

HYBRID SPECTRO-MORSE ACOUSTIC AUTHENTICATION SYSTEM AND METHOD

BACKGROUND OF THE INVENTION

1. Field of the Invention

The present invention relates to audio authentication and identity verification, and more specifically to a lightweight, scalable method of encoding a legible digital identity within high frequency audio content.

2. Description of the Prior Art

It is generally known in the prior art to provide audio-based authentication or watermarking.

Prior art patent documents include the following:

US Patent Publication No. 2024/0362738 for System for mitigating the problem of deepfake media content using watermarking by inventors Alattar, et al., filed Mar. 4, 2024, and published Oct. 31, 2024, is directed to watermarking media content, in combination with blockchain and distributed storage networks, which prevents the proliferation of Deepfake content. Digital watermarks are embedded in the audio and video tracks of video clips of trusted content producers at the time the videos are captured or before they are distributed. The watermarks are detected at the social media network's portals, nodes, and back ends. The embedded watermark imparts a unique identifier to the video, that links it to a blockchain. The watermarks also allow video source tracking, integrity verification, and alteration localization. The watermark detectors can be standalone software applications, or they can be integrated with other applications. They are used to perform three main tasks: (1) they alert the Internet user when he watches an inauthentic news video, so that he may discard it, (2) they prevent a Deepfake content from propagating through the network (3) they perform forensic analysis to help track and remove Deepfake content postings.

US Patent Publication No. 2024/0127833 for System and methods thereof for audio authentication by inventors Goshen, et al., filed Dec. 26, 2023, and published Apr. 18, 2024, is directed to a system and method for authenticating audio. A method includes sampling audio captured by an array of microphones based on sound produced by audio sources; generating an audio channel per audio source for the audio captured by the array of microphones, wherein each audio channel is a portion of the sampled audio produced by a respective audio source; generating a unique acoustic signature (UAS) for the audio sources by processing portions of the sampled audio of each audio source in order to create processed audio, wherein the UAS is a set of acoustical parameters representing acoustical properties of each audio source; generating a hashing value based on the UAS and the audio channel per audio source; and encoding the processed audio using the hashing value in order to generate encoded audio, wherein the encoded audio is authenticated using the hashing value and the UAS.

U.S. Pat. No. 11,477,156 for Watermarking and signal recognition for managing and sharing captured content, metadata discovery and related arrangements by inventor Lord, filed Aug. 31, 2020, and issued Oct. 18, 2022, is directed to content being identified using watermarking and/or other content recognition combined with contextual metadata, which facilitates identification and correlation with other content and metadata when it is posted to a network.

U.S. Pat. No. 10,964,332 for Audio communication method and apparatus for watermarking an audio signal with spatial information by inventor Gautama, filed Sep. 20, 2017, and issued Mar. 30, 2021, is directed to an apparatus and method for speech communication. An audio transmit processor captures at least two audio signals from an audio source, and processes the at least two audio signals to provide a mono audio signal and a non-audio signal comprising spatial information representative of the direction of the audio source. The audio transmit processor combines the non-audio signal with the mono audio signal by watermarking; and transmits the watermarked audio signal. An audio receive processor receives a watermarked audio signal and extracts a mono audio signal and a non-audio signal comprising spatial information from the watermarked audio signal. The audio receive processor processes the mono audio signal and spatial information to generate at least two output audio signals.

U.S. Pat. No. 10,777,210 for Key phrase detection with audio watermarking by inventor Garcia, filed Mar. 19, 2019, and issued Sep. 15, 2020, is directed to methods, systems, and apparatus, including computer programs encoded on computer storage media, for using audio watermarks with key phrases. One of the methods includes receiving, by a playback device, an audio data stream; determining, before the audio data stream is output by the playback device, whether a portion of the audio data stream encodes a particular key phrase by analyzing the portion using an automated speech recognizer; in response to determining that the portion of the audio data stream encodes the particular key phrase, modifying the audio data stream to include an audio watermark; and providing the modified audio data stream for output.

U.S. Pat. No. 9,317,872 for Encoding and decoding an audio watermark using key sequences comprising of more than two frequency components by inventors Courtney III, et al., filed Jul. 1, 2013, and issued Apr. 19, 2016, is directed to systems, methods and computer program products for providing targeted location-based communications. An exemplary apparatus is configured to receive an encoded signal, decode the encoded signal such that embedded data is retrieved, send the embedded data a remote server; and receive a message based at least partially on sending the embedded data. Create a message vector based on the message comprising of a plurality of key sequences, each of which comprises more than two frequency components and is associated with a unique bit. Another exemplary apparatus is configured to provide the encoded signal by receiving data input, receiving a host signal, embedding the data input within the host signal such that an encoded signal is generated, and transmitting the encoded signal. A third exemplary apparatus is configured to provide the targeted communications by storing one or more messages associated with an entity, receiving data, selecting at least one of the one or more messages based at least partially on the data received, and sending the at least one of the one or more messages selected.

US Patent Publication No. 2012/0203363 for Apparatus, system and method for activating functions in processing devices using encoded audio and audio signatures by inventors Mckenna, et al., filed Dec. 30, 2011, and published Aug. 9, 2012, is directed to an apparatus, system and method for accessing supplementary data and/or executing software on a device capable of receiving multimedia. After multimedia is received, ancillary code is detected and a signature is concurrently extracted from an audio portion of the multimedia. The ancillary code includes a plurality of code symbols arranged in a plurality of layers in a predetermined time period, and the signature is extracted from features of the audio of the multimedia. Supplementary data is accessed and/or software is executed using the detected code an/or signature.

U.S. Pat. No. 9,942,602 for Watermark detection and metadata delivery associated with a primary content by inventors Petrovic, et al., filed Nov. 24, 2015, and issued Apr. 10, 2018, is directed to methods, devices, systems and computer program products that enable and enhance delivery and use of metadata that is associated a primary multimedia content. Watermarks that are detected by a watermark extractor produce an indication as to a state of the watermark detector as being in one of a an unmarked content state, a marked content state or a gap state, and cause the watermark extractor to transition from one state to another state based on event that are recognized based a failure or a success in detecting watermarks, an indication of low content activity and a previous state of the watermark extractor. The events and states associated with the watermark extractor further allows retrieval of new metadata associated with the primary content, use of an existing metadata in a modified manner or a change in presentation of a secondary content that is associated with the primary content.

SUMMARY OF TIE INVENTION

The present invention relates to audio authentication and identity verification, and more specifically to a lightweight, scalable method of encoding a legible digital identity within high frequency audio content.

It is an object of this invention to provide an audio authentication and identity verification system, that encodes dynamic cryptographic information across the audible and inaudible spectrum.

In one embodiment, the present invention includes a method for audio authentication and identity verification, including emitting an inaudible audio signature, wherein the inaudible audio signature includes a unique identifier, a time, a date, and a set of location coordinates, modulating the inaudible audio signature using one or more modulation schemes selected from amplitude modulation, frequency modulation, phase modulation, pulse-duration modulation, frequency-shift keying (FSK), phase-shift keying (PSK), or any combination thereof, and encoding the inaudible audio signature within an audio content by overlaying the inaudible audio signature as at least one carrier at a lane-center frequency or as a set of carriers within a designated band of the audio content, wherein a payload encodes at least one of the unique identifier, the time, the date, or the set of location coordinates as a direct alphanumeric symbol mapped to at least one tone and/or at least one pulse duration.

In another embodiment, the present invention includes a system for audio authentication and identity verification, including a near-field communication (NFC)-enabled piezoelectric emitter device operable to playback or emit an inaudible audio signature, wherein the inaudible audio signature includes a unique identifier, a time, a date, and a set of location coordinates, wherein the system is operable to modulate the inaudible audio signature using one or more modulation schemes selected from amplitude modulation, frequency modulation, phase modulation, pulse-duration modulation, frequency-shift keying (FSK), phase-shift keying (PSK), or any combination thereof, wherein an audio content is encoded with the inaudible audio signature by overlaying the inaudible audio signature as at least one carrier at a lane-center frequency or a set of carriers within a designated band of the audio content, and wherein the audio content is operable to be verified by verifying the identity, the time, the date, and the set of location coordinates of the encoded inaudible audio signature.

In yet another embodiment, the present invention includes a method for audio authentication and identity verification, including emitting an inaudible audio signature, wherein the inaudible audio signature includes a unique identifier, a time, a date, and a set of location coordinates, modulating the inaudible audio signature using one or more modulation schemes selected from amplitude modulation, frequency modulation, phase modulation, pulse-duration modulation, frequency-shift keying (FSK), phase-shift keying (PSK), or any combination thereof, encoding the inaudible audio signature within an audio content by overlaying the inaudible audio signature as a single-line carrier at lane-center frequency onto frequency carriers of the audio content into the ultrasonic band, decoding the inaudible audio signature via at least one of band-pass filtering, time-frequency analysis including fast Fourier transform analysis, short-time Fourier transform analysis, or Goertzel analysis, envelope or correlation detection, phase retrieval, checksum validation, and/or error-detecting validation, and verifying the audio content by verifying the identity, time, date, and location data of the encoded inaudible audio signature.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 10 is a block diagram of a receiver pipeline according to one embodiment of the present invention.

DETAILED DESCRIPTION

Figure 1:
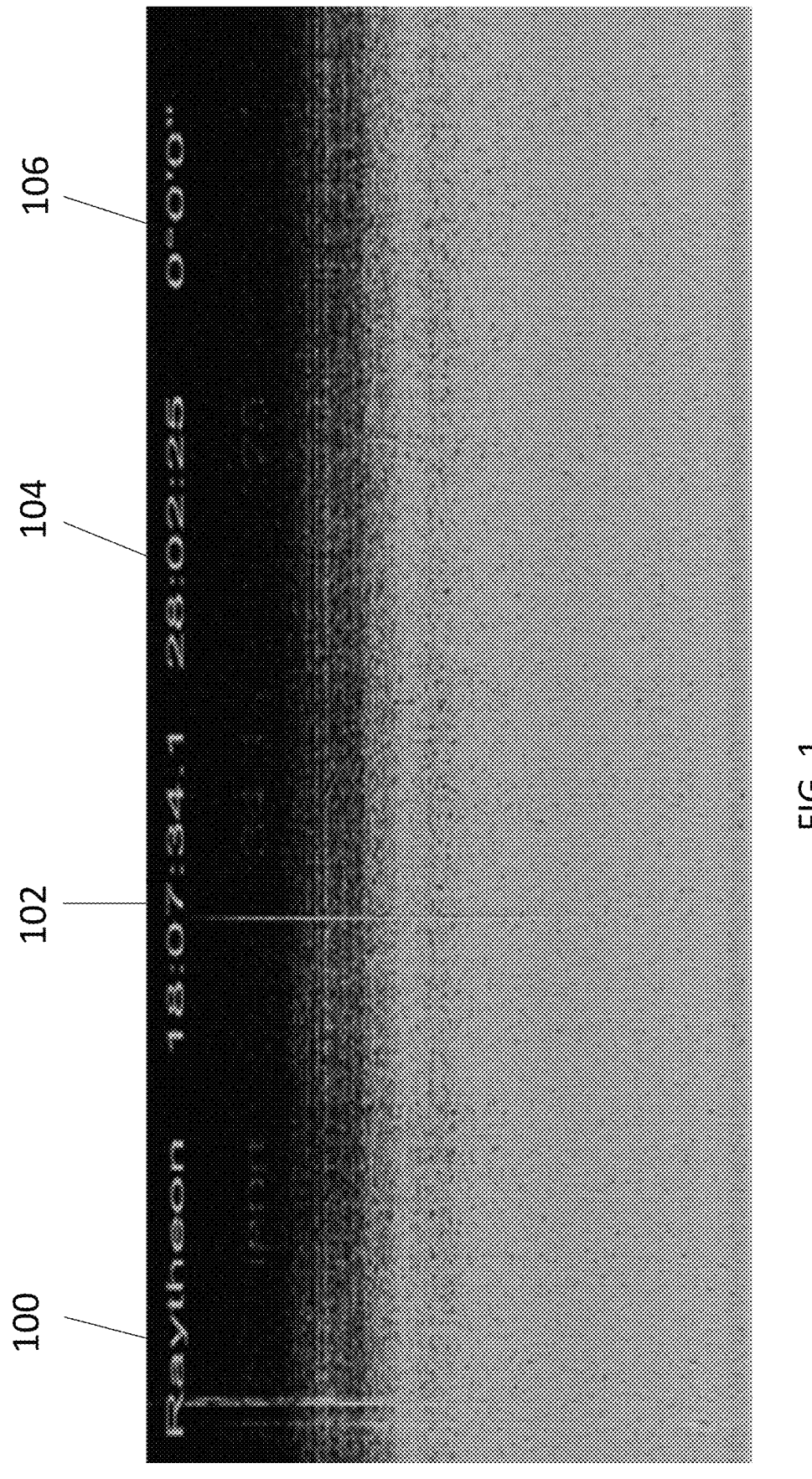
FIG. 1 illustrates audio content with an embedded inaudible signature of one embodiment of the present invention.

The present invention is generally directed to audio authentication and identity verification, and more specifically to a lightweight, scalable system and method of encoding a legible digital identity within high frequency audio.

In one embodiment, the present invention includes a method for audio authentication and identity verification, including emitting an inaudible audio signature, wherein the inaudible audio signature includes a unique identifier, a time, a date, and a set of location coordinates, modulating the inaudible audio signature using one or more modulation schemes selected from amplitude modulation, frequency modulation, phase modulation, pulse-duration modulation, frequency-shift keying (FSK), phase-shift keying (PSK), or any combination thereof, encoding the inaudible audio signature within an audio content by overlaying the inaudible audio signature as at least one carrier at a lane-center frequency or as a set of carriers within a designated band of the audio content, wherein a payload encodes at least one of the unique identifier, the time, the date, or the set of location coordinates as a direct alphanumeric symbol mapped to at least one tone and/or at least one pulse duration, splitting the encoded audio content into at least two complementary bit segments, further comprising storing one of the at least two complementary bit segments on a device, and further comprising storing one of the at least two complementary bit segments in a cloud database, decrypting, via a decryption key, the at least two complementary bit segments, and further comprising recording a decryption event on an immutable ledger, shifting the inaudible audio signature across multiple sub-bands within the full 0 Hz-124 kHz spectrum, wherein the inaudible audio signature further includes a date-of-birth, storing the inaudible audio signature as uncompressed audio as a high-resolution WAV file at 48 kHz or higher, concealing the inaudible audio signature by applying acoustic dithering, noise shaping, and randomized scheduling to the inaudible audio signature, and mapping the unique identifier directly to acoustic symbols, including, to the at least one tone and/or the at least one pulse duration without hashing.

In another embodiment, the present invention includes a system for audio authentication and identity verification, including a near-field communication (NFC)-enabled piezoelectric emitter device operable to playback or emit an inaudible audio signature, wherein the inaudible audio signature includes a unique identifier, a time, a date, and a set of location coordinates, wherein the system is operable to modulate the inaudible audio signature using one or more modulation schemes selected from amplitude modulation, frequency modulation, phase modulation, pulse-duration modulation, frequency-shift keying (FSK), phase-shift keying (PSK), or any combination thereof, wherein an audio content is encoded with the inaudible audio signature by overlaying the inaudible audio signature as at least one carrier at a lane-center frequency or a set of carriers within a designated band of the audio content, wherein the audio content is operable to be verified by verifying the identity, the time, the date, and the set of location coordinates of the encoded inaudible audio signature, further comprising a dual custody and shared key privacy architecture wherein the dual custody and shared key privacy architecture is operable to split the encoded audio content into at least two complementary bit segments, wherein one of the at least two complementary bit segments is stored on a device, and wherein one of the at least two complementary bit segments is stored in a cloud database, wherein the inaudible audio signature is stored as uncompressed audio including as a high-resolution WAV file at 48 kHz or higher, further comprising an anti-jamming module operable to shift the inaudible audio signature across multiple sub-bands within the full 0 Hz-124 kHz spectrum, wherein the inaudible audio signature further includes a date-of-birth, and wherein parity blocks and watermark fragments are embedded into the inaudible audio signature.

In yet another embodiment, the present invention includes a method for audio authentication and identity verification, including emitting an inaudible audio signature, wherein the inaudible audio signature includes a unique identifier, a time, a date, and a set of location coordinates, modulating the inaudible audio signature using one or more modulation schemes selected from amplitude modulation, frequency modulation, phase modulation, pulse-duration modulation, frequency-shift keying (FSK), phase-shift keying (PSK), or any combination thereof, encoding the inaudible audio signature within an audio content by overlaying the inaudible audio signature as a single-line carrier at lane-center frequency onto frequency carriers of the audio content into the ultrasonic band, decoding the inaudible audio signature via at least one of band-pass filtering, time-frequency analysis including fast Fourier transform analysis, short-time Fourier transform analysis, or Goertzel analysis, envelope or correlation detection, phase retrieval, checksum validation, and/or error-detecting validation, verifying the audio content by verifying the identity, time, date, and location data of the encoded inaudible audio signature, splitting the encoded audio content into at least two complementary bit segments, further comprising storing one of the at least two complementary bit segments on a device, and further comprising storing one of the at least two complementary bit segments in a cloud database, decrypting, via a decryption key, the at least two complementary bit segments, wherein the decryption key is partitioned into five shards using a 3-of-5 Shamir secret sharing scheme, further comprising recording a decryption event on an immutable ledger, wherein the time-frequency analysis further comprises a Goertzel filter bank tuned to expected carriers, wherein the inaudible audio signature further includes a date-of-birth, and storing the inaudible audio signature as uncompressed audio at a high-resolution WAV file at 48 kHz or higher.

None of the prior art discloses a lightweight, scalable system and method of encoding a legible digital identity within high frequency audio content using one or more modulation schemes selected from amplitude modulation, frequency modulation, phase modulation, pulse-duration modulation, frequency-shift keying (FSK), phase-shift keying (PSK), or any combination thereof, and time domain multiplexing.

Audible content and media are everywhere in the world, and part of everyone's day-to-day life in one way or another, whether it be through music, film, or media broadcasts, audio content is everywhere and a part of everyone's daily lives.

Generally, the media content consumed by people is unsecured, as there is no existing method or system to authenticate, track, and/or protect audible content. Moreover, the threat of piracy remains rampant, along with unauthorized duplication and misuse of content, all of which threaten the authenticity of audible content.

Additionally, the emergence of artificial intelligence (AI) technology has allowed for the creation of AI-generated content and deep-fake audio, which presents further concerns over the authenticity of audio content. Thus, there is a need for mechanisms of audio authentication which cannot be tampered with and has the ability to authenticate the content and ownership of the audio content.

Conventional digital identity verification relies on networked cryptosystems, watermarks confined to file formats, or device-bound tokens. No current methods of identity verification for audio content provide a universal, air-gap capable, media-agnostic mechanism that travels with sound itself and remains verifiable from any microphone capture or recording while binding to who, when, and where a signal originated and resisting replay or tampering.

Thus, there is a need for a system and method for transactional acoustic identity verification that works across all audio contexts, including live, broadcast, phone, radio, and/or body-worn cameras, operates offline and out-of-band relative to networks and codecs, embeds ID, time, and location continuously, with integrity and error control, scales to many simultaneous emitters without collision, and supports privacy-preserving claims (e.g., age) without exposing raw personally identifiable information (PII).

The present invention provides a system and method for embedding a signature within audio content, such that the signature is imperceptible to humans but detectable through precise signal analysis, thereby providing a system and method for authenticating audio content.

The present invention is generally directed to a lightweight, scalable method of encoding a legible digital identity within high frequency audio, referred to herein as Hybrid SpectroMorse signaling. The present invention encompasses signal generation, embedding, decoding, verification, replay procedures, anti-jamming operations, secure time synchronization, multi-carrier fallback, key recovery, side-channel resistance, adaptive channel equalization, tamper notification, and post-quantum key encapsulation suitable for real-time, offline hardware emission, or recorded environments.

In one embodiment, the present invention provides an authentication and identity verification system that encodes dynamic cryptographic information across the audible and inaudible spectrum (0 Hz→30 kHz, scalable to 124 kHz), wherein a rolling acoustic signature simultaneously embeds identity, time, date, and global positioning system (GPS) location using one or more modulation schemes selected from amplitude modulation, frequency modulation, phase modulation, pulse-duration modulation, frequency-shift keying (FSK), phase-shift keying (PSK), or any combination thereof, and time domain multiplexing. In one embodiment, any functional modulation scheme for amplitude, frequency, or phase is operable to encode identity, timestamp, date, and geolocation, preventing alternative-scheme workarounds.

Referring now to the drawings in general, the illustrations are for the purpose of describing one or more preferred embodiments of the invention and are not intended to limit the invention thereto.

In one embodiment, the present invention provides a system for embedding a dynamically rolling authentication signal across the 0 Hz-124 kHz spectrum, including infrasonic and ultrasonic, using hybrid FSK/PSK modulation, wherein the signal continuously encodes identity, timestamp, date, and geolocation data.

In one embodiment, the present invention provides a method for audio content authentication and identity verification, including emitting an inaudible audio signature, wherein the inaudible audio signature includes a unique identifier, a time, a date, and a set of location coordinates, modulating the inaudible audio signature using one or more modulation schemes selected from amplitude modulation, frequency modulation, phase modulation, pulse-duration modulation, frequency-shift keying (FSK), phase-shift keying (PSK), or any combination thereof, and encoding the inaudible audio signature within the audio content by overlaying the signature as at least one carrier at a lane-center frequency or a set of carriers within a designated band of the audio content. In one embodiment, the method includes obtaining audio content. In one embodiment, the method includes playing audio content. In one embodiment, the method includes receiving audio content.

In one embodiment, encoding the audio signature within the audio content includes acquiring fields for the audio signature including an identifier, a time, a date, and a set of location coordinates, hashing an alphanumeric identity based on the identifier, forming payload bits by connecting the identifier, the time, the date, and the set of location coordinates, applying forward error correction (FEC), performing a cyclic redundancy check (CRC), partitioning the payload bits info frames of duration, inserting pilot symbols, computing a gating window per frame, choosing an ultrasonic carrier frequency based on a device profile, wherein the carrier is a single-line (one frequency) carrier, generating the audio signature, overlaying the inaudible audio signature onto frequency carriers of the audio content, and storing the audio signature.

In one embodiment, the method is operable to be used in real-time, as audio content is being provided, such as during a speech, during a concert, or during a teaching lecture.

In one embodiment, the Morse style pulse duration modulation is selected from amplitude, frequency, phase, and/or pulse-duration modulation. In one embodiment, any suitable modulation can be used, including tone modulation, phase modulation, frequency modulation, spread-spectrum modulation, multi-tone modulation, chirp modulation, or orthogonal frequency-division multiplexing (OFDM) modulation.

In one embodiment, the system is operable to embed an inaudible signature into audio content, wherein the signature includes a unique identifier (ID), the time, the date, and the location coordinates. FIG. 1 illustrates audio content with an embedded inaudible signature of the present invention, including a unique ID 100, the time 102, the date 104, and location coordinates 106. In one embodiment, the location coordinates 106 are global positioning system (GPS) location coordinates. In one embodiment, the location coordinates 106 are live GPS coordinates.

In a preferred embodiment, the signature is undetectable to human ears. In a preferred embodiment, the signature is operable to be read by sound analyzers, spectrometers, and/or spectrograph, wherein a spectrogram can be produced. In one embodiment, the system is operable to yield human-interpretable glyphs in a spectrogram to assist manual forensic review.

In one embodiment, the audio content is operable to be authenticated. In one embodiment, the system is operable to authenticate audio content on demand.

Figure 2:
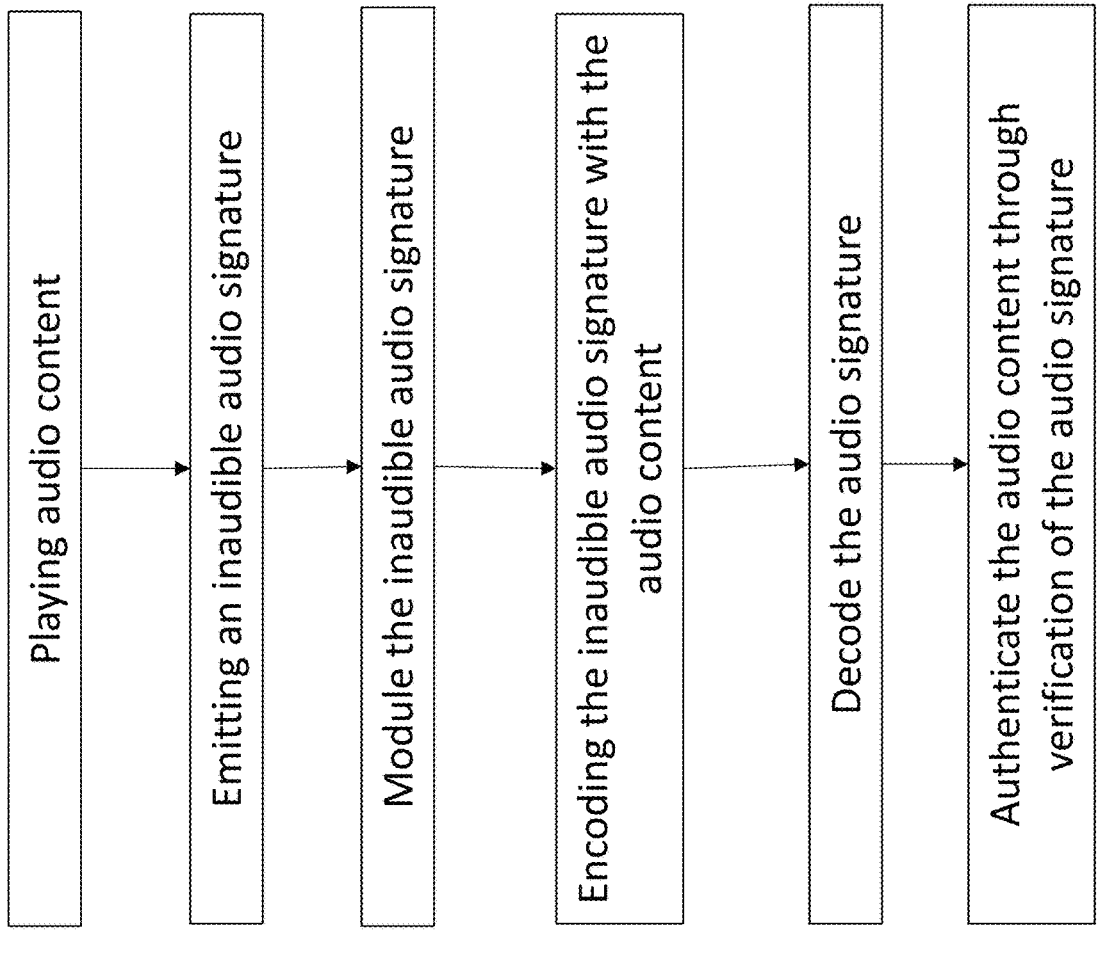
FIG. 2 illustrates a block diagram of a method of authenticating audio content according to one embodiment of the present invention.

FIG. 2 illustrates a block diagram of a method of authenticating audio content 108 according to one embodiment of the present invention, including playing audio content, emitting an inaudible audio signature, wherein the inaudible signature includes a unique identifier, a time, a date, and a set of location coordinates, modulating the inaudible audio signature using one or more modulation schemes selected from amplitude modulation, frequency modulation, phase modulation, pulse-duration modulation, frequency-shift keying (FSK), phase-shift keying (PSK), or any combination thereof encoding an inaudible signature within the audio content by overlaying the inaudible audio signature as a single-line carrier at lane-center frequency into the band frequency carriers of the audio content, decoding the audio signature via band-pass filtering, FFT analysis, phase retrieval, and checksum validation, and authenticating the audio content by verifying the identity, time, date, and location data of the encoded audio signature.

In one embodiment, the hybrid modulation scheme includes using FSK carriers (narrowband tones), optional PSK states for additional (multiple) symbol depth, Morse-style pulse-duration modulation, and/or pulse durations alone or in combination with tones encode the payload. In one embodiment, the fields of ID, time, date, and GPS are time-multiplexed and roll once per milli-second in dynamic mode.

In one embodiment, acoustic carriers reside in an ultrasonic band (e.g., ≥18 kHz) with device-profiled placement, wherein, in one embodiment, a subset may extend into the upper audible band under psychoacoustic masking.

Figure 3:
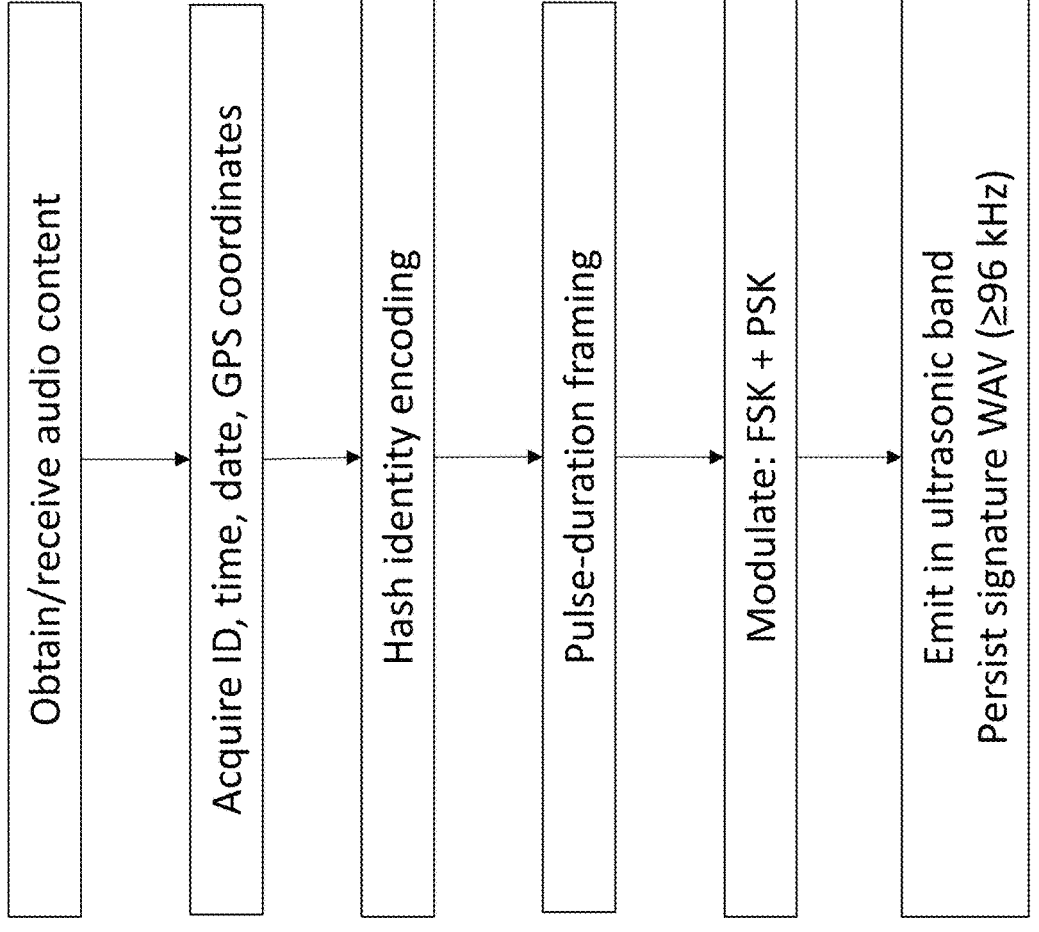
FIG. 3 is a block diagram of a method for generating and embedding an inaudible signature according to one embodiment of the present invention.

FIG. 3 is a block diagram of a method for generating and embedding the inaudible signature 110 according to one embodiment of the present invention, including obtaining/receiving audio content, acquiring the unique ID, time, date, and GPS coordinates, wherein high frequency acoustic identity encoding is performed by hashing an alphanumeric identity, mapping said hash to a frequency-phase pair framed and emitting in the inaudible band alongside the audio.

In one embodiment, the present invention provides a method for high frequency acoustic identity encoding comprising the steps of: (a) hashing an alphanumeric identity; (b) mapping said hash to a frequency-phase pair framed and emitted in the inaudible band alongside the audio; and (c) transmitting said pair as a sinusoidal carrier within an inaudible band. In one embodiment, the system is operable to use high frequency acoustic identity encoding at the time of audio content capture. In one embodiment, the system is operable to use high frequency acoustic identity encoding during concurrent playback of audio content.

In an alternative embodiment, the identity component is generated by direct symbol mapping without hashing, wherein each alphanumeric element is assigned a tone and/or pulse duration according to a predetermined table, and the composite signal follows the same framing and error-control structure.

In one embodiment, the system is operable to include a mathematical encoding structure, wherein the encoded signal $S(t)S(t)$ is defined as:

$$S(t)=\text{sum}\_\{n=0N\_g-1\}w(t-n^*T\_g)^*A(t)^*\cos(2^*pi^*F(t)^*t+Phi(t))+N(t)$$

$w(t-n^*T\_g)$ is a smooth gating window for glyph n of duration $T\_g$.

$Phi(t)$ is the phase modulation.

$N(t)$ is background noise.

$A(t)$ is the amplitude function. $A(t)A(t)$ is the amplitude modulation function that varies based on the signal encoding scheme.

$F(t)$ is the instantaneous frequency. $F(t)f(t)$ is the frequency function, dynamically shifting within the 20 KHz-23 kHz range or the same logic for various bandwidth combinations as required, covering 0-124 kHz.

$Phi(t)=2^*pi^*(m\_n/M)+phi\_frame(n)$ is the phase modulation component that encodes cryptographic identity data, wherein $m\_n$ is the PSK symbol index for glyph n (from 0 . . . M−1), derived from the identity, M is the PSK order, and $phi\_frame(n)$ is an optional small phase dither for robustness (seeded; zero if unused).

In one embodiment, the system is operable to include identity encoding, including a hybrid of FSK and PSK, wherein the identity component II is encoded using a hybrid frequency and phase modulation approach:

$$I(t)=\text{sum}\_\{n=0 \ldots N\_g-1\}w(t-n^*T\_g)^*\cos(2^*pi^*(f\_c+\text{delta}\_f^*s\_n)^*t+2^*pi^*(m\_n/M))f\_c$$

is the carrier picked from the identity.

$s\_n$ is the frequency symbol for glyph n (e.g., from {−1,0,+1} or a small discrete set).

$m\_n/M$ is the PSK phase term.

To map the identity to a frequency in the 20 kHz-23 kHz range:

```
U = bytes_to_integer( SHA256( ID ‖ seed ) )
K = number_of_lanes
delta_f = (23000 − 20000) / K      // Hz per lane
lane_index = U mod K
f_c = 20000 + lane_index * delta_f   // Hz
```

ID is the user/device identity. Seed is a session/provisioning seed. f_c lies in [20000 Hz, 23000 Hz). To use another band, replace 20000/23000 with f_min/f_max; logic is unchanged.

The hashed identity converted to a numeric range includes:

```
H = SHA256( ID ‖ seed )
U = bytes_to_integer( H )      // 0 .. 2^256 − 1
u_norm = U / 2^256             // 0.0 .. <1.0 (if a normalized real is needed)
```

Use U mod K for lane selection; use floor(U/K) mod M for phase selection.

To encode phase-shifted unique identity (PSK index):

$$m0=\text{floor}(U/K) \bmod M$$

$$phi \text{ identity}=2^*pi^*(m0/M)$$

U=bytes_to_integer(SHA256(ID‖seed)); K=number_of_lanes; M is PSK order, phi identity is the identity-bound phase used for the first glyph (and/or as a seed for m_n).

In one embodiment, the hybrid frequency and phase modulation approach ensures that even two nearly identical identities generate significantly different acoustic signatures.

In one embodiment, the system is operable to include a rolling timestamp and GPS encoding within the inaudible signature, wherein the time, date, and GPS coordinates are encoded using a frequency-multiplexed time-domain function:

$S\_time(t)=sum\_\{j \text{ in } \{yr,mo,dy,hr,mi,se,ms\}\}$ $A\_j*cos(2*pi*(f0\_j+alpha\_j*d\_j)*t+psi\_j)$ $lat\_scaled=round((lat\_deg+90)*1e5)$ $lon\_scaled=round((lon\_deg+180)*1e5)$ $S\_gps(t)=A\_lat*cos(2*pi*(f0\_lat+$
$alpha\_lat*lat\_scaled)*t+psi\_lat)+A\_lon*cos$
$(2*pi*(f0\_lon+alpha\_lon*lon\_scaled)*t+psi\_lon)$ $S\_total(t)=I(t)+S\_time(t)+S\_gps(t)$ d_j is the current UTC field digit or bucket for j (year, month, day, hour, minute, second, millisecond).

f0_* are disjoint base slots; alpha_* are per-field frequency steps; psi_* are fixed/dither phases.

lat_deg, lon_deg are GPS coordinates in degrees.

Additional phase component to prevent interference (per-slot dithers):

$psi\_j=2*pi*((bytes\_to\_integer(SHA256(ID\|\text{"slot:}$
$\text{"}\|j\|epoch\_sec)) \text{ mod } M\_j)/M\_j)$ j is the slot label (yr, mo, dy, hr, mi, se, ms, lat, lon), epoch_sec is the current second (or a fixed seed) to decorrelate between frames, M_j is a small integer (e.g., 8 or 16) setting the dither resolution, and Use psi_lat and psi_lon similarly with j="lat" or "lon".

The GPS coordinates are converted into frequency components and added as an auxiliary encoding layer.

Each of the components of the frequency-multiplexed time-domain function are time-synchronized so that the signal continuously updates in real-time, thereby preventing duplication or replay attacks.

Figure 4:
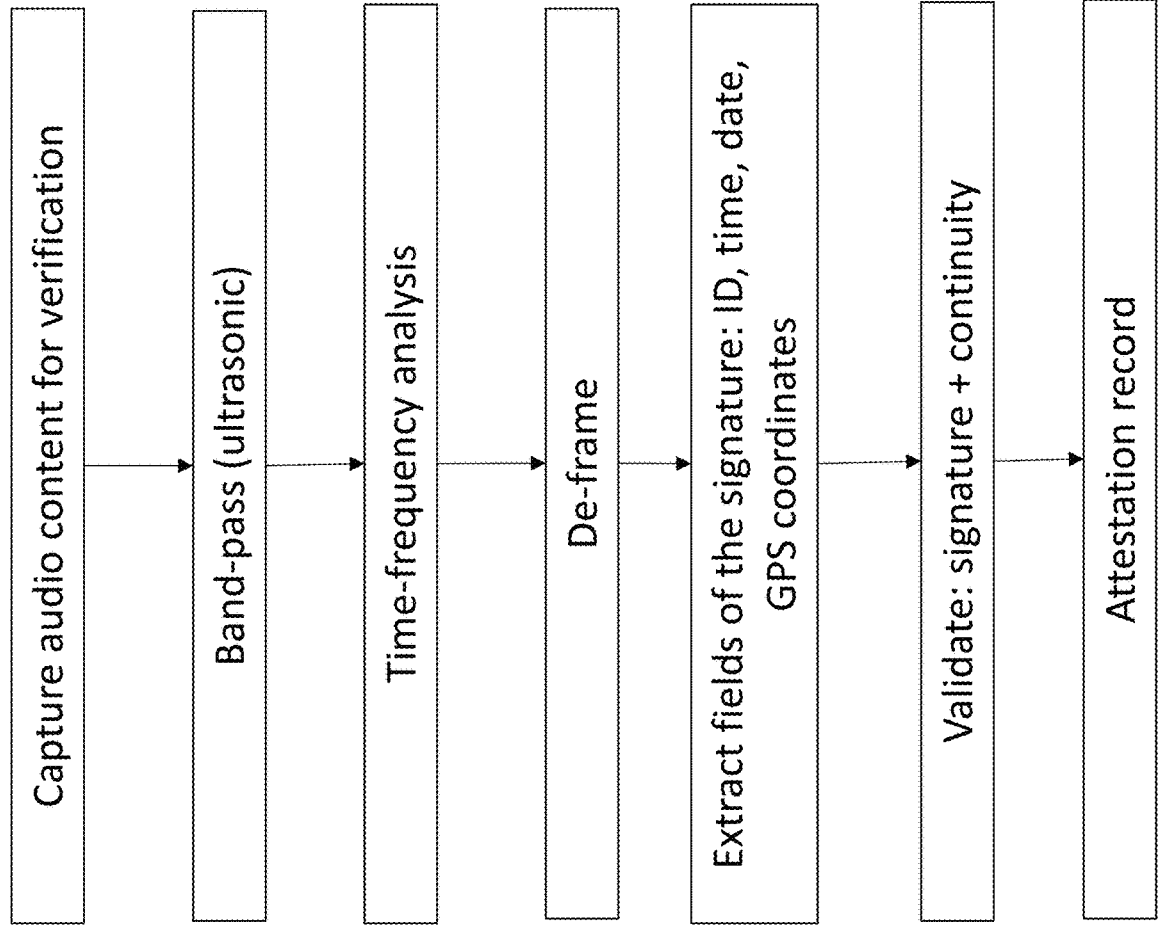
FIG. 4 is a block diagram of a method for decoding and validating the audio content according to one embodiment of the present invention.

FIG. 4 is a block diagram of a method for decoding and validating the audio content 112 according to one embodiment of the present invention, including capturing audio for verification, performing band-pass filtering, conducting time-frequency analysis, de-framing, extracting the fields from the signature, including ID, time, date, and GPS coordinates, validating the fields of the signature to verify the audio content, and recording the validation of the audio content in an attestation record.

In one embodiment, decoding including performing a fast Fourier transform (FFT) to extract frequency components, analyzing phase shifts to detect identity markers, correlating detected frequencies with known timestamp and location encoding methods, and validating data integrity using cryptographic checksums. Decoding the audio content includes the following steps: (1) capture audio content at ≥48 kHz (≥96 kHz preferred), (2) perform band-pass filtering at 18-24 kHz (device-adjusted), (3) STFT/Goertzel at f_c; detect pilot for coarse sync; estimate frame boundaries, (4) demodulate the single-line carrier: complex demod at f_c; recover phase trajectory and envelope over each gated frame to estimate symbol values, (5) de-frame by applying an FEC decoder and verifying a CRC check, (6) parsing the fields of the inaudible signature, including ID, time, date, and GPS coordinate to verify continuity across frames; verify cryptographic MAC if present; emit attestation record.

The decoding algorithm of the present invention includes:

Step 1—Band-Pass and Preconditioning:

```
x[n] = BPF_18_24k( y[n] )   // band-pass ~18-24 kHz (device-profiled)
noise_floor = estimate_noise(x[n]) // for SNR & adaptive thresholds
```

Step 2—Pilot Detection and Coarse Sync (Time+Frequency):

Search the expected pilot code (e.g., Barker-13 BPSK) around the lane center(s).

For each candidate lane center f_c in lane_set:

```
z[n] = x[n] * exp( -j*2*pi*f_c*n/Fs )      // complex demod at f_c
r[k] = correlate_with_pilot( z[k:k+L] )    // sliding correlation
pick peak r[k*] → coarse time τ0, lane index, code phase
CFO_hat = estimate_CFO( z, around τ0 )     // small carrier-freq offset
```

Step 3—Frame Sync (Gating Windows):

```
τ = refine_time( z, τ0 )            // refine start of frame
apply_gating_windows( τ, T_g )      // match the transmit window w(t)
compensate_frequency( z, CFO_hat )  // remove CFO
```

Step 4—Symbol (Glyph) Decisions Per Frame (Hybrid FSK+PSK):

For each glyph window n, evaluate allowed frequency excursions s∈S and PSK states m∈{0 . . . M−1}.

for each glyph n:
for each s in S:

```
          // e.g., S = {-1, 0, +1} or small set
G_s = sum_over_window( z[n] * exp( -j*2*pi*(Δf*s)*t/Fs ) )
E_s = |G_s|^2
s_n = argmax_s( E_s )      // FSK decision
phi_n = angle( G_{s_n} )
m_n = nearest_phase_index( phi_n, M ) // PSK decision
margin_n = decision_margin( E_{s_n}, {E_s} )
record (s_n, m_n, margin_n)
```

Step 5—De-Frame and De-Interleave; Accumulate Digits:

Map (s_n, m_n)→symbol digits; undo the keyed interleaver; accumulate one macro-frame's payload.

```
digits = deinterleave_and_map( { (s_n, m_n) } )
fill_positions_until_complete( digits, target=44 )   // radix-36 digits for 28B
```

Step 6—FEC Decode and CRC Check:

```
bytes28 = radix36_unpack( digits )       // 44 digits → 28 bytes
payload20 = RS_28_20_decode( bytes28 )    // Reed-Solomon (28,20) over GF(256)
```

-continued

```
if CRC16_check( payload20 ) == FAIL: reject
parse payload20 → VERFLAGS, ID64, UTC30, LOC35, CRC16
```

Step 7—Continuity and Integrity Checks:

SNR≥6 dB, |CFO_hat|≤5 Hz, |timing_error|≤2 ms, mean (margin_n)≥1.5 UTC continuity across frames; GPS coherence with device context (if used) lane-hop and interleaver key consistent with (ID64, UTC30, LOC35) if any check fails: reject Step 8—AUX (if VERFLAGS Indicates AUX Present):

Decode next super-frame's AUX block and verify the age-claim pointer.

AUX=RS_28_20_decode(AUX        bytes)        and CRC16_check compute        DIGEST        10*=truncate_10(SHA256 (ID64∥issuer_id∥SUBJECT∥EXPIRY∥salt))

if DIGEST10*!=DIGEST10_on_air: reject verify Ed25519 signature on ACT; check EXPIRY/ valid_to; evaluate policy (e.g., ≥18)

Step 9—Attestation Output:

return {ID64, UTC30, LOC35, VERFLAGS, (AUX if any), metrics, PASS/FAIL}

In a preferred embodiment, the inaudible audio signature includes a unique identifier, a time, a date, and a set of location coordinates. In an alternative embodiment, the inaudible audio signature includes a date-of-birth. In one embodiment, the date-of-birth value is encoded in at least one form selected from the group consisting of a packed date field comprising year, month, and day, an encrypted date-of-birth addressed to a relying party's public key, and/or a cryptographic commitment to date-of-birth (including a salted hash or digest) that binds to a signed off-band attestation retrievable by the verifier.

In one embodiment, the identity value and the date-of-birth value of the inaudible signature are issued only after government identity verification by a third-party identity verification service.

In one embodiment, the encrypted date-of-birth value is carried in a date-of-birth auxiliary (AUX) record comprising a record type identifier, a version, a subject binding to the identity value, an expiry, and a ciphertext with an authentication tag verifiable by the relying party offline.

In one embodiment, the date-of-birth value is operable to be stored in a secure identity wallet of an application on a mobile device.

In one embodiment, the system includes an enabled microphone in order to include the date-of-birth value in the inaudible signature.

In one embodiment, the date-of-birth value matches a signed age-claim token (ACT) stored off-band, wherein the signed age-claim token contains a date-of-birth and a digital signature of an issuer, wherein a verifier can match a digest in the date-of-birth AUX record to the signed age-claim token, verify the signature, and evaluate an age rule without exposing the date-of-birth to the relying device. For example: AUX carries DIGEST=Trunc(SHA-256(CBOR ({sub:ID64, dob:YYYY-MM-DD, issuer, valid to, sig})). Verifier matches DIGEST to a locally cached or fetched signed token (Ed25519), checks issuer and expiry, and computes age without placing DOB on-air.

In one embodiment, the date-of-birth value is packed as a fixed-width field comprising a year subfield, a month subfield, and a day subfield, and is protected by the same forward-error correction and error-detecting code as the identity, time, and location fields.

In one embodiment, the date-of-birth value is included by adding a VERFLAGS bit (e.g., VERFLAGS.bit2=1) indicating "date-of-birth value present." For example, YEAR12 (12 bits, offset from 1900→range 1900-4095), MONTH4 (1-12), DAY5 (1-31): total 21 bits (fits in 3 bytes), wherein it is stored in either the main payload or in AUX.

In one embodiment, when VERFLAGS.AUX=1, the next superframe carries a 20-byte AUX record with its own FEC/CRC and interleaving:

AUX_TYPE (1B)|AUX_VER (1B)|SUBJECT (4B)|EX-PIRY (4B)|DIGEST10 (10B)

SUBJECT=truncated hash binding the AUX to ID64, DIGEST10=first 10 bytes of a cryptographic hash (e.g., SHA-256) of an off-band signed attestation (e.g., CBOR/JSON), never including raw DOB on-air.

In one embodiment, the date-of-birth value is carried in at least one of: (i) a primary payload field, or (ii) a companion auxiliary record in a successive frame. In one embodiment, the primary payload field includes a compact date-of-birth pack, for example, YEAR|MONTH|DAY, within the FEC-protected 20-byte data block, or an alternative block size with updated RS parameters. In one embodiment, the companion auxiliary record carries the date-of-birth value in the next super frame's auxiliary record, including either plaintext packed or encrypted, or as a commitment digest that binds to a signed off-band token containing the date-of-birth value.

In one embodiment, the present invention provides a method for age verification using an acoustic identity signal within a band between 0 Hz and 124 kHz, including prompting a client platform to enable a microphone to capture a live acoustic signal from a user device, receiving microphone audio comprising a sequence of frames each including a synchronization pilot and payload slots, decoding the frames to recover an identity value, a time value, a location value, and a date-of-birth element carried in at least one of: (i) a primary payload field, or (ii) a companion auxiliary record in a successive frame, applying forward-error correction and an error-detecting code to the recovered data, verifying freshness by rejecting replays based on the time value and an expected modulation/hopping sequence derived from the identity value and the location value, and determining eligibility for an age threshold by computing age from the date-of-birth element and gating access to an age-restricted service when the threshold is met.

In one embodiment, the system includes a transmitter, and a receiver configured to perform the method as described herein, wherein the receiver is integrated with a platform age-gate that prompts microphone access and conditions user onboarding or session continuation upon successful live verification of the identity value and date-of-birth value.

In one embodiment, the system includes a non-transitory computer-readable medium storing instructions which, when executed by a platform device, cause the device to request microphone access, operable to capture and verify the acoustic frames including the DOB value, and authorize or deny access to an age-restricted function.

In one embodiment, the system includes an acoustic signal comprising frames within an acoustic band of 0-124 kHz that embody a pilot for synchronization, payload symbols encoding an identity value, a time value, and a location value, and further encoding a date-of-birth value in a primary payload or an auxiliary record, the signal being sufficient for a receiver to compute age and enforce an age threshold.

In one embodiment, the date-of-birth value is encrypted, for example: AUX record fields: AUX_TYPE=DOB_ENC, AUX_VER, SUBJECT (=trunc hash of ID), EXPIRY, and CIPHERTEXT+TAG truncated or chunked across consecutive AUX frames; ciphertext produced by AEAD (e.g., XChaCha20-Poly1305) under the relying party's public key (via HPKE), enabling offline verifier decryption.

In one embodiment, the system includes a dual custody audio split and shared key privacy architecture to ensure evidentiary sound data cannot be accessed or tampered with unilaterally. In one embodiment, the architecture includes bit interleaved storage, wherein each authenticated audio is divided into two interleaved halves/complementary bit segments, a U segment and a B segment. In one embodiment, the U segment is stored on a device. In one embodiment, the B segment is stored in a cloud database.

In one embodiment, the inaudible audio signature is stored as uncompressed audio as a high-resolution waveform audio file format (WAV) file at 48 kHz or higher. In a preferred embodiment, the inaudible audio signature is stored as uncompressed audio as a high-resolution waveform audio file format (WAV) file at 96 kHz. In one embodiment, the authenticated audio is stored within the U and B segments.

In one embodiment, the split storage of the U segment on the device and the B segment in a cloud database advantageously provides security of the authenticated recording, such that the consent of an individual device and a cloud device is required to combine the split files.

In one embodiment, a decryption key is fragmented via Shamir 3-of-5 secret sharing, wherein advanced encryption standard (AES)-256 ciphertext keys are fragmented into five shards, wherein any three shards are required to decrypt, and wherein three shards are held separately by different parties, including a user, the system, and an authorized third-party warrant office.

Figure 5:
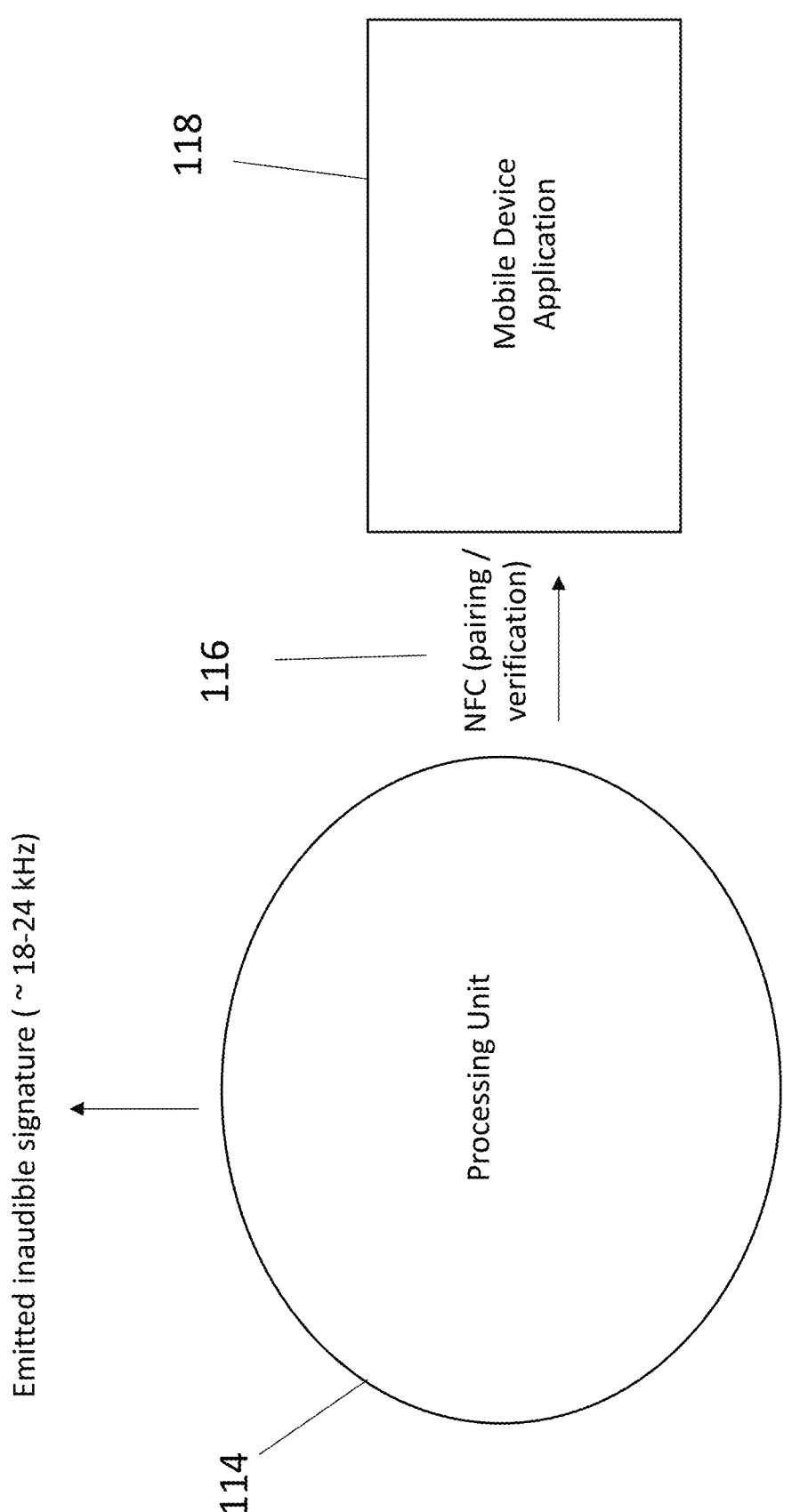
FIG. 5 illustrates an emitter device according to one embodiment of the present invention.

In one embodiment, the present invention provides a system for audio content authentication and identity verification, including a near-field communication (NFC)-enabled piezoelectric emitter device operable to playback or emit an audio signature. In one embodiment, the present invention provides a system for audio content authentication and identity verification, including a user device enabled with an on-device application operable to record and verify audio content. FIG. 5 illustrates an emitter device 114 wherein the emitter device 114 includes a processing unit, NFC technology for pairing the emitter device 114 to a mobile device, and ultrasonic piezoelectric emitter power, wherein the emitter device 114 is operable to emit an audio signature, wherein the emitter device 114 is operable to connect to a mobile device through NFC 116, wherein a mobile device application 118 on the mobile device is operable to record and verify the audio content emitted from the emitter device 114 In one embodiment, the emitter device 114 is coin-sized.

In one embodiment, the system includes a near field communication (NFC)-enabled piezoelectric emitter device configured to store, retrieve, and emit a pre-recorded signature upon NFC activation, wherein the emitter device includes an NFC interface for secure communication with a mobile device, a piezoelectric transducer tuned to ≥30 kHz for inaudible emission which is operable to produce higher- SNR inaudible carriers than typical phone speakers, and an on-board controller that synchronizes emission timing and frequency parameters. In one embodiment, the NFC-enabled piezoelectric emitter device is operable to playback or emit stored inaudible signatures. In one embodiment, the piezoelectric transducer tuned to ≥30 kHz produces the acoustic mark that authenticates concurrently captured audio/video, wherein the audio channel itself remains unchanged. In one embodiment, the controller supports offline operation. In one embodiment, the controller runs a local framing and hops schedule. In one embodiment, the NFC interface provides secure provisioning, trigger/wake functions, and optional time-sync capabilities.

In one embodiment, the system includes at least one speaker and/or at least one microphone.

Figure 6:
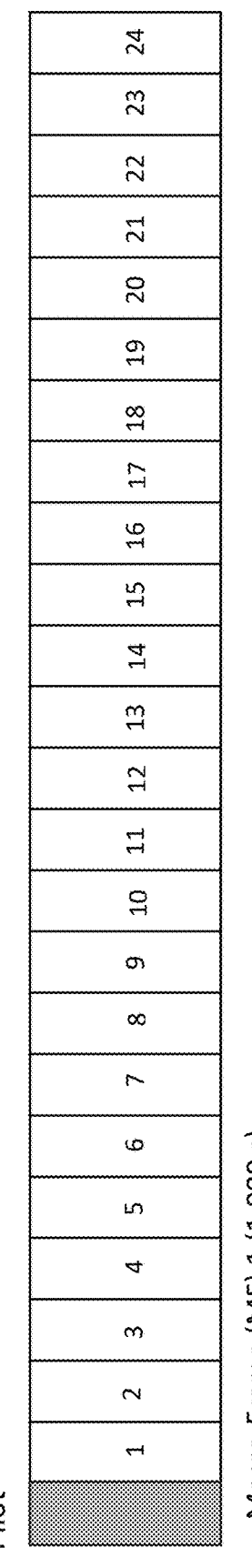
FIG. 6 illustrates protocol timing according to one embodiment of the present invention.

FIG. 6 illustrates protocol timing, including illustrating the 1-second macro-frame with pilot at slot 0, payload and reserved reference glyphs in remaining slots, and the 2-second superframe that carries one FEC-protected payload. In one embodiment, the protocol timing provides deterministic timing, sync, and anti-replay via per-second updates. In one embodiment, the protocol timing includes horizontal single-line lane. In one embodiment, the protocol timing includes stacked/multiplexed lanes.

Figure 7:
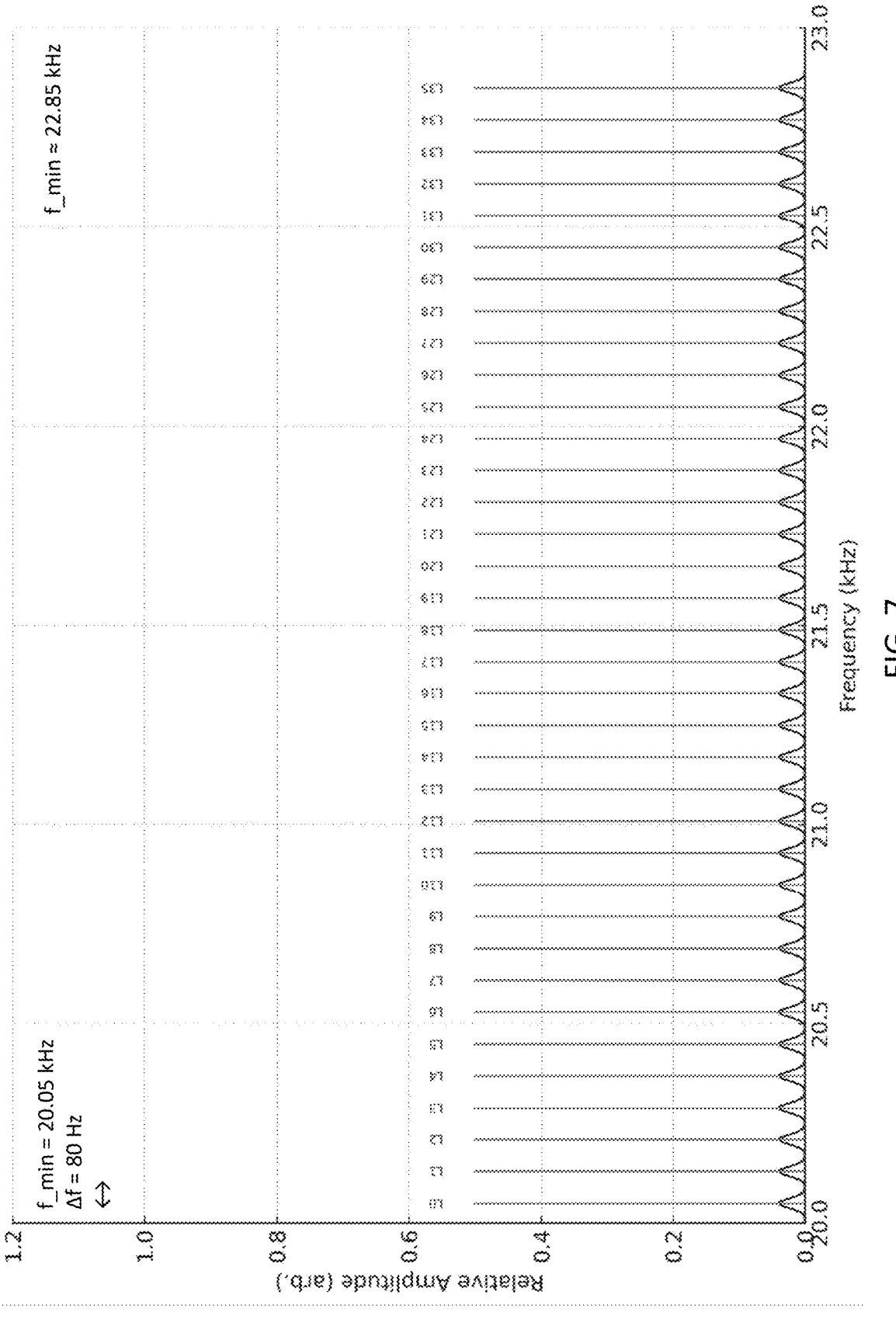
FIG. 7 illustrates a lane grid across an acoustic band according to one embodiment of the present invention.

FIG. 7 illustrates a lane grid across an acoustic band, illustrating discrete lanes across the ultrasonic band (example: 36 lanes, $\Delta f$ spacing) that allow multi-user separation and hopping.

Figure 8:
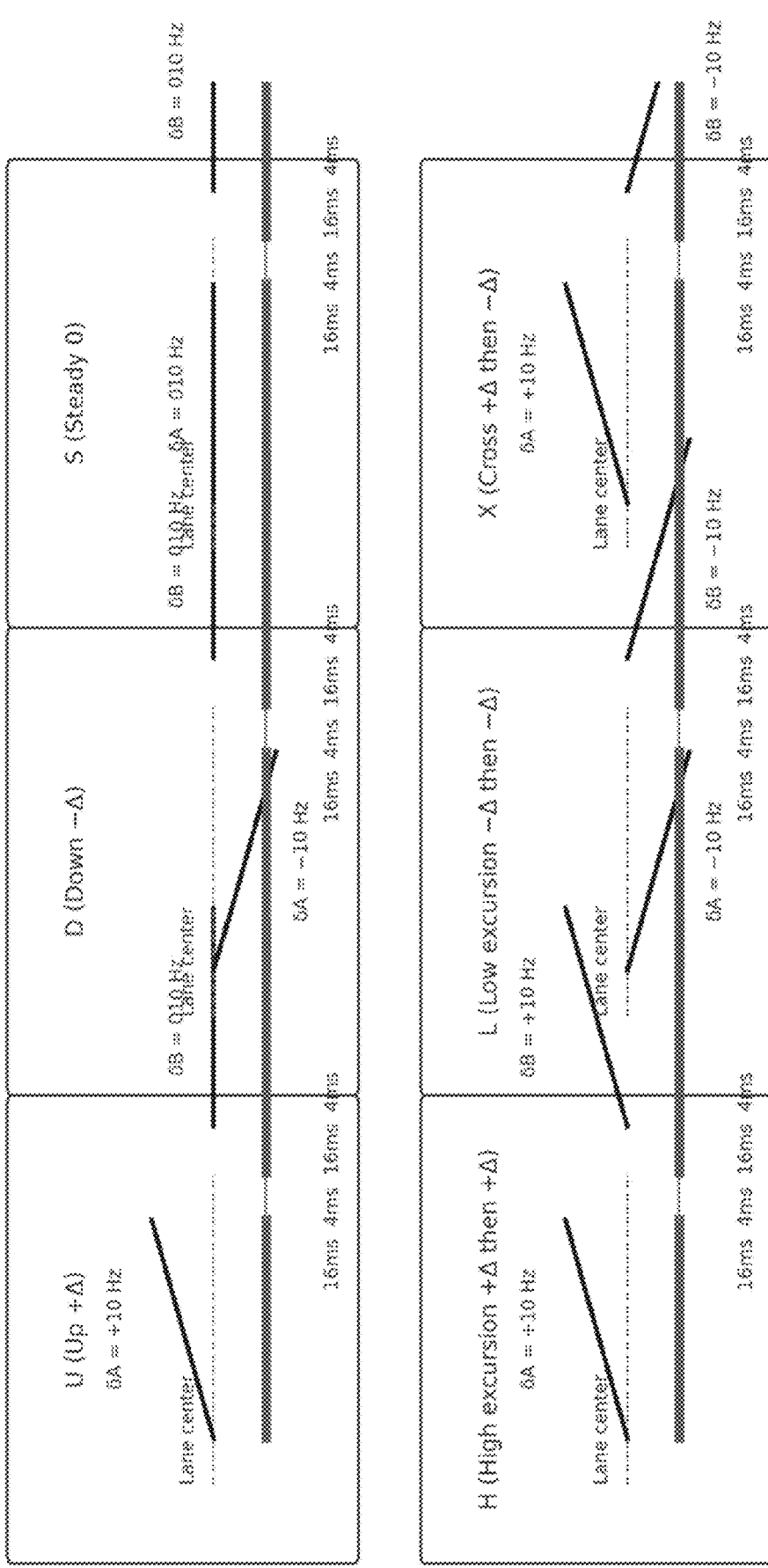
FIG. 8 illustrates SpectroGlyph atoms and $\pm\Delta$ excursions around the lane center according to one embodiment of the present invention.

FIG. 8 illustrates SpectroGlyph atoms and $\pm\Delta$ excursions around the lane center, wherein two-atom micro-patterns (e.g., U/D/S/H/L/X) around a lane center that map base-36 digits are defined, such that the receiver classifies with matched filters.

Figure 9:
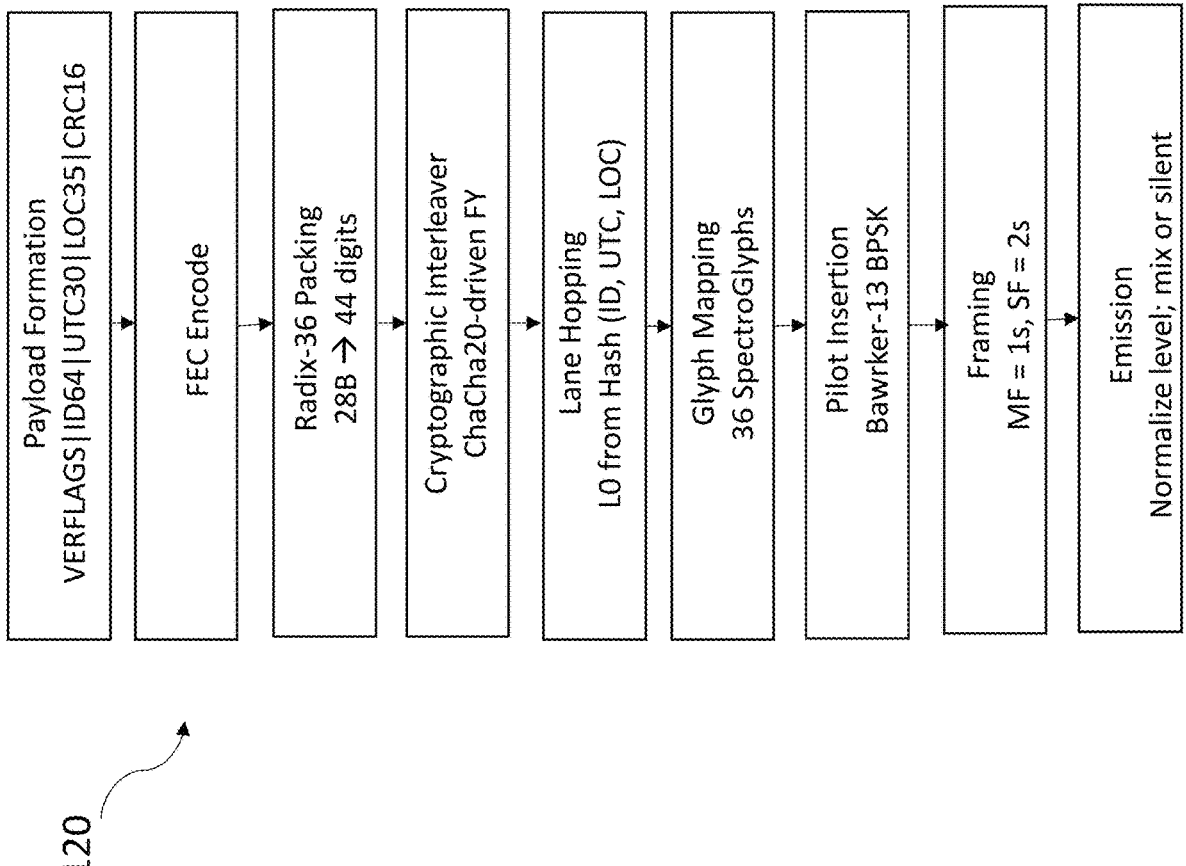
FIG. 9 is a block diagram of a transmitter pipeline according to one embodiment of the present invention.

FIG. 9 is a block diagram of a transmitter pipeline 120, including payload formation, RS(28,20), base-36 packing, cryptographic interleaver, (optional) lane hopping, glyph mapping and emission with pilot.

FIG. 10 is a block diagram of a receiver pipeline 122, including band-limit, per-lane down-convert, pilot correlation for r/CFO, glyph detection, de-interleave, RS+CRC, integrity gates (SNR/CFO/r, lane-hop recompute), attestation, wherein a receiver may use FFT, STFT, or Goertzel banks and either envelope/correlation or phase retrieval depending on the transmitted modulation.

Figure 11:
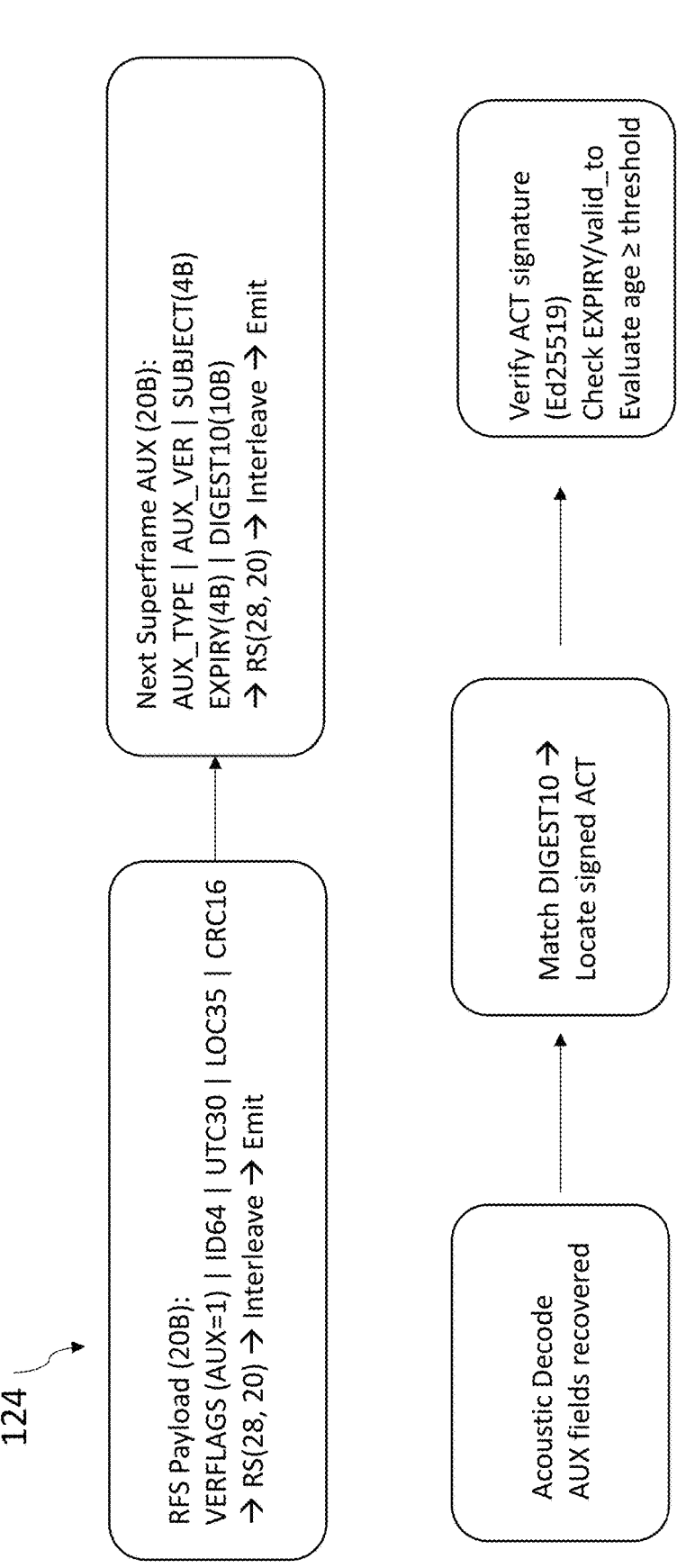
FIG. 11 is a block diagram of a, auxiliary age-claim binding: digest pointer & verifier flow according to one embodiment of the present invention.

FIG. 11 is a block diagram of a auxiliary age-claim binding: digest pointer & verifier flow 124, wherein an on-air RFS payload followed by the AUX superframe carrying a digest pointer, wherein a verifier matches digest to a signed off-band token (e.g., Ed25519) and checks expiry.

In one embodiment, a rolling framed signature (RFS) protocol encodes identity (ID), time, and location of the inaudible signature into acoustic micro-frames and macro-frames carried anywhere in 0-124 kHz, with synchronization pilots, forward error correction, cryptographic interleaving, anti-replay, and multi-user lane hopping.

In one embodiment, common signaling parameters include: Sample rate (Tx/Rx): preferably 96 kHz for ultrasonic embodiments; other rates permitted (e.g., 44.1/48/192 kHz) so long as slot timing is preserved. Acoustic band: any sub-range in 0-124 kHz. Preferred consumer-ultrasonic profile: 20.05-22.85 kHz, lane grid (example profile): 36 lanes equally spaced by $\Delta f=80$ Hz with centers $f[i]=f\_min+i\cdot\Delta f$, slot timing: 40 ms (16 ms atom+4 ms gap+16 ms atom+4 ms guard), windowing: tukey $\alpha=0.125$ per atom, or equivalent smooth window reducing spectral splatter, leveling: peak ≤−18 dBFS, RMS gate ≤−22 dBFS for psychoacoustic headroom, and/or receiver baseband: per-lane complex down conversion, LPF ±500 Hz, decimate to ~2 kHz complex stream.

In one embodiment, the RFS protocol includes a production identity layer, wherein the frame structure and payload include macro-frame (1.000 s): slot 0=pilot; slots 1 . . . 24=payload/markers and/or superframe (2.000 s): two macro-frames form one error-protected payload.

In one embodiment, the identity payload is 20 bytes, and FEC-protected. In one embodiment, the identity payload includes:

VERFLAGS (1B)|ID64 (8B)|UTC30 (4B)|LOC35 (5B) |CRC16 (2B)

VERFLAGS: version/flags, ID64: 64-bit identity, UTC30: seconds since a fixed epoch (e.g., 2025-01-01 UTC), LOC35: quantized latitude ($17b$) and longitude ($18b$), and CRC16: CCITT-FALSE over preceding 18 bytes.

In one embodiment, forward error correction includes RS(28,20) bytes (or BCH/LDPC in alternatives).

In one embodiment, digitization & interleaving includes Pack the 28 RS bytes into 44 base-36 digits, then interleave via a cryptographically keyed Fisher-Yates (e.g., ChaCha20 keystream), binding order to codeIndex, UTC30, and the starting lane.

In one embodiment, the reserved reference glyphs include two fixed slots per macro-frame carry known glyphs (e.g., "BOTH") to improve detection, visualization, and TDOA/ forensics. The remaining 22 slots per macro-frame carry payload digits (total 44 per superframe).

In one embodiment, the system includes a SpectroGlyph alphabet, wherein each base-36 digit maps to a two-atom micro-pattern with $\pm\Delta f\_small$ excursions (e.g., ±10 Hz) around the lane center, including:

Atom set examples: U(up), D(down), S(steady), H(high), L(low), X(cross).

A glyph=Atom-A (16 ms)+gap (4 ms)+Atom-B (16 ms)+ guard (4 ms).

In alternative embodiments, the SpectroGlyph alphabet includes phase-keyed atoms, short chirps, OFDM micro-tones within a lane's sub-grid, or DSSS chips.

In one embodiment, lane assignment and hopping includes (1) Compute H=Hash(ID64||UTC30||Quantized (LOC35)), starting lane L0=H mod Nlanes, using 3-lane hopping per macro-frame {L0, L0+N/3, L0+2N/3 (mod N)} or an m-lane maximal-spacing pattern, and round-robin payload placement across lanes to distribute energy and diversity.

In one embodiment, the system includes a synchronization pilot, wherein the pilot establishes timing (τ) and carrier frequency offset (CFO), selects a pilot codeIndex from a small orthogonal bank for user disambiguation, and sets acceptance thresholds (e.g., SNR≥6 dB, |CFO|≤5 Hz, |τ|≤2 ms). In one embodiment, the pilot is (slot 0): known sequence (e.g., BPSK Barker-13) of ~20 ms followed by silence.

In one embodiment, the system includes a transmit algorithm, operable to build the 20-byte payload and compute CRC, FEC-encode to 28 bytes; pack into 44 base-36 digits, Determine lanes and interleaver order from ID64, UTC30, LOC35, and codeIndex, and for each macro-frame, emit pilot on the active lane; place reserved glyphs; place 22 payload digits into the non-reserved slots across the hopping lanes; normalize levels.

In one embodiment, the system includes a receive algorithm, operable to band-limit to the chosen acoustic band; for each candidate lane, downconvert to baseband, Pilot correlation bank→accept or reject (thresholds); estimate τ and CFO; recover codeIndex, Glyph matched filters per slot; accept a glyph when both half-slot margins exceed a decision threshold, Accumulate interleaved digits across up to 10 seconds until all 44 are filled, De-interleave→FEC decode→ CRC verify, Integrity gates: recompute lane hop sequence from the decoded fields; reject if inconsistent, and provide output (ID64, UTC, Lat/Lon, SNRs, CFO, τ, FEC corrections, margins).

In one embodiment, the system includes anti-replay and freshness, wherein UTC30 updates each second; hopping and interleaver keys depend on the current fields—captured frames fail freshness later, and verifiers enforce a clock-skew window (e.g., ±5 s) and distance drift bound from LOC35.

In one embodiment, the system includes psychoacoustic inaudibility, wherein the system is operable to place carriers ≥20.05 kHz, taper atoms, keep low absolute level, and avoid difference-tone leakage. In an alternative audible-band embodiment, (e.g., public address systems), the system is operable to apply masking models to remain imperceptible beneath instantaneous speech/music thresholds.

In one embodiment, the system includes two compatible emission modes including fixed-tone per character and timing-coded Morse, wherein the fixed-tone per character mode includes ~800 ms tone+200 ms gap; lane chosen by symbol map (A-Z0-9→lanes), wherein the timing-coded Morse mode includes dot/dash durations at a fixed lane.

In one embodiment, the system includes a blockchain-based audit module operable to record every decryption event as an on-chain hash, countersigned by all participating custodians, providing immutable zero-knowledge access logs for forensic audit. In one embodiment, every decryption event triggers the blockchain-based audit module, which is operable to record an on-chain hash of the event and is countersigned by all participating custodians, providing an immutable, zero-knowledge audit trail. In one embodiment, the split storage and key sharding architecture advantageously preserves privacy while guaranteeing that voice evidence remains untampered and legally defensible.

In one embodiment, the system includes a multiplexed timestamp and GPS encoding scheme operable to assign discrete frequency slots to year, month, day, hour, minute, second, millisecond, latitude, and longitude, wherein the frequency slots are time synchronized, and phase offset to prevent inter channel interference.

In one embodiment, the method includes a lightweight, scalable method of encoding a legible digital identity within high frequency audio, wherein an inaudible audio signature as a single-line carrier is overlaid at lane-center frequency into the band frequency carriers of the audio content, enabling redundancy and legible recovery from noisy channels. In one embodiment, the Morse style pulse duration includes a modulation selected from amplitude, frequency, phase, and/or pulse-duration.

In one embodiment, the method includes a decoding method, comprising band pass filtering, fast Fourier transform (FFT) analysis, phase retrieval, and checksum validation to recover and verify the identity, time, date, and location data from any encoded audio.

In one embodiment, the method includes an authentication method for resonant materials or objects, wherein an acoustic signature is embedded into the structural resonance of a manufactured object, allowing subsequent verification by acoustic excitation and detection. In one embodiment, the method includes a material and resonance ID, which uses a structure's unique vibrational signature as a physically anchored second factor for authentication, wherein a short, inaudible excitation is applied to a part (metal, ceramic, composite), wherein the excitation includes encoding the ID, the time, the date, and the location coordinates as in inaudible signature. In one embodiment, the inaudible signature includes rolling metadata, wherein second-by-second code changes ensure freshness and replay resistance.

In an alternative embodiment, the inaudible signature includes a broadband exponential sine sweep (ESS) segment to estimate hobjh_{\text{obj}} with high SNR. In one embodiment, ESS is used to obtain hobjh_{\text{obj}} robustly in the presence of noise and mild nonlinearity, deconvolution yields the linear IR, and/or higher-order harmonics are time-separated.

In one embodiment, the resonant material is a metal. In one embodiment, a sound/acoustic wave is applied into the structure of a resonant material, wherein the sound/acoustic wave is physically anchored with the resonant material, which creates a variation in the resonant material that remains after the resonant material has finished forming and/or is cooled, wherein the variation in the lattice structure of the resonant material is operable to be activated by an activity, such as striking the material or exciting the material, wherein the resonant material emits an audio signature upon activation.

In one embodiment, the measured response is the object's transfer function acting on the inaudible signature:

$$y(t)=(h_{obj}*S_{bothX})(t)+n(t)$$

$h_{obj}$ is the part's impulse response/frequency response function (FRF), $S_{bothX}$ is the encoded stimulus, and n(t) is noise. Because $h_{obj}$ depends on geometry, boundary conditions, microstructure, and internal stress/damping, it yields a repeatable, object-specific fingerprint recoverable from any microphone/accelerometer/laser vibrometer measurement. The result is two proofs in one shot, including (1) content/authorship proof via the inaudible signature (rolling ID+timestamp+location) and (2) object proof via resonance/FRF match, a mechanical "PUF-like" challenge-response).

In one embodiment, the authentication method for resonant materials or objects includes mounting or fixing the part defined by the boundary condition, emitting $S_{bothX}$(t)+ESS, recording y(t)y(t), estimating impulse response hobjh_{\text{obj}} and FRF Hobj(ω)H_{\text{obj}}(\omega), extracting features, including modal peaks {fi}\{f\_i\}, Q, modal spacing, phase, coherence, wherein the inaudible signature is stored, as previously described herein.

In one embodiment, the resonant material or object can be verified by decoding the inaudible signature.

The frequency response function relates output to input under sinusoidal excitation; it is the central observable of experimental modal analysis used to identify natural frequencies, mode shapes, and damping (Q factors):

$$FRF\ H(\omega)=Y(\omega)X(\omega)H(\omega)=\frac{Y(\omega)}{X(\omega)}$$

For plates, shells, and laminates (e.g., aircraft skins, composite panels), Lamb waves propagate with mode-dependent dispersion and are highly sensitive to thickness, layup, and defects, rendering them ideal for structural identification and repeatable fingerprints across 20-100+ kHz regimes.

Laser Doppler Vibrometry (LDV) measures vibrational velocity/deflection without mass-loading and across a large bandwidth, enabling precise FRF/impulse-response capture and Q-factor estimation on metal/composite coupons and finished parts.

A physical unclonable function (PUF) maps a challenge to a device-specific response due to uncontrollable physical randomness, which is widely used for hardware identity. Acoustic/mechanical PUFs have been demonstrated for sensor/structure identification and integrity monitoring.

In one embodiment, the authentication method for resonant materials or objects includes an exciter, a sensor and/or a controller. In one embodiment, the exciter is a piezo patch, miniature shaker, or air-coupled ultrasonic transducer (near-ultrasonic/ultrasonic band). In one embodiment, the sensor is a contact accelerometer, microphone (for air-radiated response), or LDV for non-contact readout. In one embodiment, the controller is an emitter device, as previously described herein, with a calibrated digital-to-analog converter (DAC)/analog-to-digital converter (ADC) and an optional LDV interface.

In one embodiment, the authentication method for resonant materials or objects can be used in the following industries: aerospace parts, automotive parts, defense and secure supply chains, luxury goods, precious metals, and/or industry molds and tooling.

In one embodiment, the system includes a computer implemented algorithm executable on commodity hardware and operable to generate and store a signature as uncompressed audio as a high-resolution waveform audio file format (WAV) file at 48 kHz or higher, and a corresponding algorithm that validates the file against live or recorded audio. In a preferred embodiment, the system is operable to store a signature as uncompressed audio as a high-resolution waveform audio file format (WAV) file at 96 kHz.

In one embodiment, the system is operable to integrate the emitter device with existing communication or recording subsystems, advantageously requiring no redesign of legacy hardware while adding quantum-resistant, tamper evident provenance metadata.

In one embodiment, the present invention provides a multimedia watermarking method comprising embedding an audio signature as an inaudible audio watermark into video or multimedia file containers, including livestream protocols and file formats, thereby binding audio provenance to audiovisual content.

In one embodiment, the system is operable to include a parameter range for frequency bands of 0-24 kHz and up to 124 kHz. In one embodiment, the system is operable to include a parameter range for symbol durations between 1-200 ms. In one embodiment, the system is operable to include a minimum signal-to-noise ratio of 20 dB to ensure reliable decoding under typical environmental conditions.

In one embodiment, the system includes a secure enclave key generation and storage module, wherein an embedded secure enclave or trusted platform module (TPM) generates shards, and stores decryption keys locally, thereby preventing unauthorized key extraction.

In one embodiment, the system includes an adaptive noise robustness method comprising applying error-correction/high-noise coding and adaptive thresholding atop the modulation to maintain successful decoding in high-noise or reverberant environments.

In one embodiment, the system is operable to embed a signature within static audio content, including a fixed snapshot of identity and a timestamp, wherein the system is operable to embed the signature within an existing audio file.

In one embodiment, the system is operable to embed a signature within dynamic content, wherein the fields including time, GPS, and nonce roll every milli-second, chaining segments for tamper evidence.

In one embodiment, the system includes an anti-jamming frequency-hopping module, wherein the anti-jamming frequency-hopping module is operable to pseudo-randomly shift the signature across multiple sub-bands within the full 0 Hz-124 kHz spectrum, using a cryptographic seed shared between emitter and receiver, thus mitigating narrowband jamming and intentional interference. In one embodiment, the anti-jamming frequency-hopping module is operable to shift the signature based on triggering by an artificial intelligence-based jamming detection. In one embodiment, the anti-jamming frequency-hopping module is operable to shift the signature pseudo-randomly.

In one embodiment, the system includes an error-resilient compression-proof encoding layer, which is operable to embed redundant parity blocks and watermark fragments into the signature. In one embodiment, the error-resilient compression-proof encoding layer enables recovery after common lossy audio codec transcoding, including through media processing service (MPS), advanced audio coding (AAC), and/or OPUS.

In one embodiment, the system includes a challenge-response authentication module, wherein the challenge-response authentication module is operable to incorporate a receiver-generated nonce into subsequent signature cycles, thereby requiring the sender to echo or sign the nonce, which prevents simple replay of recorded signals.

In one embodiment, the system includes a key provisioning and a certificate authority (CA) integration module, wherein the key provisioning and CA integration module leverages public key infrastructure (PKI) for initial identity hash issuance and secure distribution of decryption key shards.

In one embodiment, the system includes a key revocation broadcast mechanism operable to publish decryption key revocation events on-chain, which invalidates compromised keys and associated signatures, thereby preventing further decoding with revoked keys.

In one embodiment, the system includes segment signing and timestamping module, operable to apply quantum-resistant or X.509 digital signatures and timestamps to each interleaved recording segment before storage, ensuring non-repudiation and segment integrity before storage.

In one embodiment, the system is operable to measure ambient noise levels and automatically adjusts emitter amplitude and receiver gain thresholds to maintain optimal signal-to-noise ratio.

In one embodiment, the system is operable to be compliant with ultrasound exposure, wherein the system is operable to reference adherence to international ultrasonic safety standards, thereby limiting emission amplitudes and durations to safe exposure levels for humans and animals.

In one embodiment, the system includes a developer application programming interface (API) and software development kit (SDK) framework comprising REST and gRPC interfaces, client libraries for iOS, ANDROID, website, and embedded platforms, and integration guides for third-party applications to interface with functionalities of the system.

In one embodiment, the system includes a degradation fallback mode, wherein the system emits a minimal signature encoding only identities and timestamps when connectivity to the cloud-based B segment is unavailable, resuming full signature transmission upon restoration of connectivity.

In one embodiment, the system includes a compliance architecture configured to meet or exceed security standards including the Federal Information Processing Standard (FIPS) 140-3, Common Criteria, International Organization for Standardization (ISO) 27001, and International Electrotechnical Commission (IEC) 62443, ensuring regulatory alignment and certification readiness.

In one embodiment, the system includes a secure time sync module, operable to anchor device clocks to authenticate network time protocol (NTP) over transport layer security (TLS) servers or GPS pulse signals, detect clock drift, and apply automatic corrections to maintain timestamp accuracy and prevent manipulation, all of which is essential for non-repudiation, splice detection, and optional ledger anchoring of attestation events.

In one embodiment, the system includes an anti-tamper enclosure and secure boot system for a physical emitter device, including a sealed housing with tamper sensors, firmware signed by a hardware root of trust, and an OTA update protocol that verifies code signatures before execution, preventing unauthorized emitter modifications.

In one embodiment, the system includes a payload encryption module operable to apply and layer AES-Galois/Counter Mode (GCM) encryption to raw audio/video data concurrently with signature embedding, thereby ensuring both confidentiality and authenticity of the content.

In one embodiment, the system includes a radio frequency (RF) emission compliance specification, operable to mandate adherence to regional regulations, spectral masks, and certification processes for ultrasonic and RF transmissions.

In one embodiment, the system includes a privacy compliance module operable to provide secure deletion APIs, consent-managed access logs, and automated workflows for the General Data Protection Regulation (GDPR)/California Consumer Privacy Act (CCPA) compliance, granting users control over stored U/B segments.

In one embodiment, the system includes a flexible metadata payload scheme operable to support embedding user-defined metadata fields (e.g., device ID, application tags) and multiplexing of multiple independent signature streams within each acoustic cycle, thereby enhancing extensibility.

In one embodiment, the system includes an end-to-end protocol adapter operable to insert and verify the signature within secure transport protocols (secure real-time transport protocol (SRTP), Zimmermann real-time transport protocol (ZRTP), TLS) without compromising underlying encryption or integrity checks.

In one embodiment, the system includes scalability and performance metrics which define maximum processing latency ($\leq 10$ ms per 1 s window), central processing unit (CPU) utilization targets (<5% on commodity cores), and buffering strategies to guarantee real-time operation.

In one embodiment, the system includes a layer-2 log anchoring module, operable to batch decryption event hashes into off-chain Merkle trees, publish root commitments on-chain, and employ privacy filters to redact sensitive metadata while maintaining auditability.

In one embodiment, the system includes a multi-carrier emission system operable to enable synchronized RF or optical fallback channels alongside acoustic emission, ensuring continuous authentication when audio paths are blocked or jammed.

In one embodiment, the system includes a key recovery module operable to use hierarchical deterministic key derivation and secure offline storage to reconstruct decryption key shards when primary custodians are unavailable, maintaining signature operability in disaster and emergency scenarios.

In one embodiment, the system includes a side-channel resistance module operable to apply acoustic dithering, noise shaping, and randomized scheduling to conceal signatures within ambient noise, thereby thwarting unauthorized acoustic eavesdropping.

In one embodiment, the system includes an adaptive channel equalization module operable to measure channel impulse response, perform echo cancellation, and adjust filter coefficients in real-time to preserve signal fidelity in reverberant or multipath environments.

In one embodiment, the system includes a tamper notification and alerting module operable to continuously monitor hardware and software integrity of system components, integrate hardware tamper sensors and secure firmware checks, log integrity violations, and dispatch encrypted out-of-band alerts to custodians upon unauthorized modifications.

In one embodiment, the system includes a quantum key encapsulation module operable to implement lattice-based key encapsulation mechanism (KEM) algorithms for post-quantum secure identity key exchanges between emitters and verifiers, thereby future-proofing confidentiality against quantum attacks.

In one embodiment, the system includes a secure hardware supply chain module operable to embed unique cryptographic IDs into each hardware component, record signed assembly logs at every manufacturing step and perform on-device provenance checks at boot to guarantee authenticity and prevent counterfeit emitter hardware.

In one embodiment, the system includes a power-managed safe mode operable to continuously monitor battery health, including battery voltage and charge status, automatically transition the emitter to a locked state if power falls below safe thresholds or if the battery is removed, and generate an out-of-band encrypted tamper alert to custodians.

In one embodiment, the system includes a multi-emitter coexistence module operable to use time-division multiplexing (TDM) or code-division multiplexing (CDM) spread-sequences so that multiple emitters in the same environment can operate without acoustic collisions, thereby dynamically allocating time slots or codes as emitters enter or leave the acoustic space.

In one embodiment, the system includes a crypto-agility framework operable to maintain a registry of algorithm profiles, including a certificate-driven registry of approved modulation, hash, encryption, and post-quantum algorithms. In one embodiment, the crypto-agility framework is further operable to enable authenticated over-the-air swaps of modulation and cryptographic primitives and ensure backward compatibility with legacy signature formats.

In one embodiment, the system includes an underwater and extreme-environment module for subaqueous or high-stress environments. In one embodiment, the underwater and extreme-environment module is operable to use a lower frequency band (5-20 kHz), pressure-resistant enclosures, and adjusted symbol rates and SNR margins to preserve signature functionality.

In one embodiment, the system includes a group-signature mode operable to implement ring-signature or group-credential schemes so that a member of an authorized group is able to produce a valid signature without revealing their individual identity, enabling privacy-preserving collective authentication. In one embodiment, the group-signature mode includes verification logic that confirms membership in the authorized group.

In one embodiment, the system includes a distributed verification cluster, wherein the distributed verification cluster is a geo-distributed, load-balanced cloud/edge service operable to validate high-volume signature streams in real time, with automated fail-over and alerting for bulk signature anomalies. In one embodiment, the distributed verification cluster includes alerting mechanisms for bulk or anomalous signature validation.

In one embodiment, the system includes a lawful-access protocol, wherein the lawful-access protocol includes a multi-party key-escrow mechanism embedding a warrant-driven shard release path, on-chain or off-chain governance rules enforcing court orders, and cryptographic auditing of any shards reconstructed via lawful access.

In one embodiment, the system includes a light-emitting diode (LED)/tactile confirmation module, wherein the LED/tactile confirmation module includes at least one status LED and/or haptic actuator on the emitter device, real-time indication of signature embedding success, errors, or tamper lock-out, and user-configurable brightness or vibration patterns. In one embodiment, the LED/tactile confirmation module is operable to provide immediate user feedback via LEDs or haptic actuators, indicating successful embedding, errors, or tamper events, with configurable patterns for different statuses.

In one embodiment, the system includes a secure update framework, wherein the secure update framework includes signed firmware and software patch bundles, rollback protection preventing installation of out-of-sequence versions, and an immutable update audit log stored on-device or in the blockchain-based audit module. In one embodiment, the secure update framework is operable to enforce signed firmware patches, prevent rollback to outdated versions, and log update events in the blockchain-based audit module or on-device immutable storage for post-update forensics.

In one embodiment, the present invention provides a computer-implemented method for authenticating a human or device identity using an acoustic carrier between 0 hZ and 124 kHz, including generating, at a transmitter, a sequence of acoustic frames each comprising a synchronization pilot, and a plurality of payload slots carrying symbols that collectively encode an identity, a time value, and a location value, modulating said frames into the acoustic carrier and emitting them to an environment, capturing, at a receiver, audio comprising the emitted frames, estimating frame timing and frequency offset by correlating the pilot, demodulating the payload slots to recover the symbols, forward-error-correcting the symbols to produce a payload comprising the identity, the time value, and the location value, verifying integrity of the payload using an error-detecting code, and authenticating the identity conditioned on a freshness constraint that rejects replays based on the time value and an expected modulation sequence derived from the identity and the location value. In one embodiment, the method further includes selecting, by the transmitter for each frame, a hopping lane within a plurality of acoustic lanes according to a deterministic function of the identity, the time value, and the location value, and distributes the payload slots among multiple lanes to reduce collisions among simultaneous transmitters. In one embodiment, payload further includes a flag indicating the presence of an auxiliary record in a successive frame, said auxiliary record comprising a cryptographic digest of an off-band signed attestation that encodes a privacy-preserving claim without including raw personally identifiable information. In one embodiment, the payload symbols are produced by applying a forward-error correction encoding to a fixed-length data block and cryptographically interleaving the resultant code symbols using a pseudorandom permutation keyed by at least the time value and a pilot code index. In one embodiment, each payload slot carries a two-atom SpectroGlyph consisting of two windowed micro-tones around a lane center frequency with controlled frequency excursions, and the receiver employs matched filters to classify the Spec-troGlyphs.

In one embodiment, the acoustic frames comprise macro-frames of approximately one second and superframes comprising two macro-frames. In one embodiment, two fixed reference glyphs are placed at known slot indices in each macro-frame and excluded from payload interleaving. In one embodiment, the pilot comprises a Barker-sequence BPSK or a Zadoff-Chu sequence. In one embodiment, forward-error correction comprises Reed-Solomon (28,20) over GF(256), and integrity checking comprises CRC-16. In one embodiment, the receiver accepts frames only when SNR exceeds a threshold and carrier frequency offset and timing offset fall within predetermined bounds. In one embodiment, the interleaving employs a cryptographic stream generator to drive a Fisher-Yates permutation. In one embodiment, the location value is quantized to a fixed resolution to preserve privacy. In one embodiment, the auxiliary record's digest binds to a signed age-claim token that allows a verifier to check an age threshold without receiving a date of birth. In one embodiment, the acoustic carrier is in an ultrasonic band above 18 kHz and is psychoacoustically masked in the presence of program audio.

In one embodiment, the method further includes dual-custody forensic capture of ambient audio during emission, encrypting and splitting custody between device and server with secret sharing such that neither party alone can decrypt.

In one embodiment, modulation comprises one of: (i) two-atom SpectroGlyph frequency excursions, (ii) phase shift keying, (iii) multi-tone OFDM sub-bins, (iv) chirp symbols, (v) spread-spectrum chips.

In one embodiment, the receiver verifies lane-hop consistency by recomputing the expected hop sequence from the decoded identity, time, and location, rejecting mismatches as replay or forgery.

In one embodiment, the method is operable to be adapted for narrowband vocoded links, wherein symbols are embedded under voice activity detection using psycho-acoustically masked DSSS and verified from post-vocoder recordings.

In one embodiment, the transmitter is a coin-sized NFC-provisioned piezoelectric device configured to emit frames in silent-only mode for access control.

In one embodiment, the acoustic band is infrasonic below 20 Hz and the transducer comprises a tactile or structural actuator. In one embodiment, the acoustic band is audible and masking preserves imperceptibility according to a psychoacoustic model.

In one embodiment, the frames survive audio codec transformations and microphone/speaker non-linearities sufficient for verification of identity/time/location.

In one embodiment, multiple simultaneous transmitters are separated by lane hopping, pilot code indices, and glyph margin thresholds.

In one embodiment, reserved reference glyphs are human-interpretable markers to aid visualization in spectrograms without disclosing payload.

In one embodiment, the present invention provides a system including a transmitter and a receiver configured to perform the method of any of claims 1-5, wherein the transmitter is at least one of: (i) a mobile device executing an application, (ii) a dedicated piezoelectric token, (iii) a broadcast encoder; and the receiver is at least one of: (i) a software verifier, (ii) a call-recording analyzer, (iii) a radio archive verifier.

In one embodiment, the present invention provides a non-transitory computer-readable medium storing instructions which, when executed by one or more processors of a device including an acoustic transducer.

In one embodiment, the present invention provides an acoustic signal embodying frames as previously described herein, wherein when the acoustic signal is reproduced by a loudspeaker within the range 0-124 kHz, the signal carrying sufficient information for a receiver to authenticate identity with anti-replay protection.

The system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The system is operable to use any of the aforementioned learning techniques alone or in combination.

Further, the system is operable to utilize predictive analytics techniques including, but not limited to, machine learning (ML), artificial intelligence (AI), neural networks (NNs) (e.g., long short-term memory (LSTM) neural networks), deep learning, historical data, and/or data mining to make future predictions and/or models. The system is preferably operable to recommend and/or perform actions based on historical data, external data sources, ML, AI, NNs, and/or other learning techniques. The system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

In one embodiment, the system is operable to utilize AI to assist verifier-side triage, including channel classification, adaptive thresholds, and jamming detection triggers.

Use Cases

The system of the present invention is operable to be used in the defense and military industry, for tactical communications, battlefield orders, and/or encrypted radios, wherein the system is operable to provide real-time voice authentication, embedded GPS/time, an anti-deepfake and anti-jamming layer.

The system of the present invention is operable to be used in the intelligence agencies industries, for tasks such as spy operations, classified data relays, and/or command chain integrity, wherein the system is operable to verify identities, prevent deepfake commands, and/or tamper proof audio content.

The system of the present invention is operable to be used in the law enforcement industry, including for body cameras, surveillance operations, and/or court submitted audio, wherein the system is operable to provide forensic grade integrity and real-time signature embedding.

The system of the present invention is operable to be used in the government and diplomacy industry, for tasks including executive communication, political calls, and/or global summit negotiations, wherein the system is operable to prevent impersonation and record the place and/or time with an identity.

The system of the present invention is operable to be used in the emergency services industry, including for the Federal Emergency Management Agency (FEMA), the Department of Homeland Security (DHS), the National Guard, and air traffic control (ATC), wherein the system is operable to ensure alerts are real and prevent public broadcast spoofing.

The system of the present invention is operable to be used in the aviation and aerospace industry, including ATC communications, cockpit recordings, unmanned aerial vehicle (UAV) control, and/or flight data recorders, wherein the system is operable to inject ultrasonic markers, provide anti-jamming hopping, and verify the authenticity of post-crash investigators audio frames.

The system of the present invention is operable to be used in the aerospace and composite materials industry, including for resonant materials identification and structural health monitoring, wherein the system is operable to embed an inaudible signature into material resonance, to verify an origin and detect tampering.

The system of the present invention is operable to be used in the financial industry, including for voice verified transactions and/or boardroom communications, wherein the system is operable to block deepfake fraud and/or ensure transaction origin authenticity.

The system of the present invention is operable to be used in the corporate security industry, including for sensitive communications such as board meetings and/or mergers and acquisition communications, wherein the system is operable to prove speaker identity and/or location in high value discussions.

The system of the present invention is operable to be used in the media and journalism industry, including for live news reporting, podcasting, and/or whistleblower recordings, wherein the system is operable to prove human authorship and/or provide tamper proof reporting.

The system of the present invention is operable to be used in the legal industry, including depositions, court evidence, and/or affidavits, wherein the system is operable to provide court grade proof of voice origin, time, and/or location.

The system of the present invention is operable to be used in the social media industry, including TIKTOK, YOU-TUBE, REELS, SPOTIFY, and/or podcast platforms, wherein the system is operable to automatically tag human authored media with real-time acoustic watermarks.

The system of the present invention is operable to be used in the internet of things (IoT) and smart devices industry, including for voice activated drones and automation, wherein the system is operable to filter fake voice commands and/or authorize control via the signature provided by the present invention.

The system of the present invention is operable to be used in the mobile devices industry, including system level integration for iOS and/or ANDROID voice applications, wherein the system is operable to embed inaudible signatures into user audio recordings.

The system of the present invention is operable to be used in the forensic and investigation industry, including for audio chain of custody and anti-edit proof tools, wherein the system is operable to split storage signature and timestamp to ensure legal credibility.

The system of the present invention is operable to be used in the brain-computer interface (BCI) and neural interfaces, including for brain to AI ethics signal validation, wherein the system is operable to certify neural inputs with time and location stamps.

The system of the present invention is operable to be used in the offline authentication industry, including for piezo-electric NFC devices for field operatives, wherein the system is operable to emit stored signature marks and sync with a GPS.

The system of the present invention is operable to be used in the digital identity utility industry, including through a mobile application, wherein the system is operable to provide a personal sound certificate verifying voice-based authenticity.

Data Stored on a Distributed Ledger

In a preferred embodiment, the platform is operable to store data on a distributed ledger, e.g., a blockchain. Distributed ledger technology refers to an infrastructure of replicated, shared, and synchronized digital data that is decentralized and distributed across a plurality of machines, or nodes. The nodes include but are not limited to a mobile device, a computer, a server, and/or any combination thereof. Data is replicated and synchronized across a network of nodes such that each node has a complete copy of the distributed ledger. The replication and synchronization of data across a distributed set of devices provides increased transparency over traditional data storage systems, as multiple devices have access to the same set of records and/or database. Additionally, the use of distributed ledgers eliminates the need for third party and/or administrative authorities because each of the nodes in the network is operable to receive, validate, and store additional data, thus creating a truly decentralized system. Eliminating the third party and/or administrative authorities saves time and cost. A decentralized database is also more secure than traditional databases, which are stored on a single device and/or server because the decentralized data is replicated and spread out over both physical and digital space to segregated and independent nodes, making it more difficult to attack and/or irreparably tamper with the data. Tampering with the data at one location does not automatically affect the identical data stored at other nodes, thus providing greater data security.

In addition to the decentralized storage of the distributed ledger, which requires a plurality of nodes, the distributed ledger has further advantages in the way that data is received, validated, communicated, and added to the ledger. When new data is added to the distributed ledger, it must be validated by a portion of the nodes (e.g., 51%) involved in maintaining the ledger in a process called consensus. Proof of work, proof of stake, delegated proof of stake, proof of space, proof of capacity, proof of activity, proof of elapsed time, and/or proof of authority consensus are all compatible with the present invention, as are other forms of consensus known in the art. In one embodiment, the present invention uses fault-tolerant consensus systems. Each node in the system is operable to participate in consensus, e.g., by performing at least one calculation, performing at least one function, allocating compute resources, allocating at least one token, and/or storing data. It is necessary for a portion of the nodes in the system (e.g., 51% of the nodes) to participate in consensus in order for new data to be added to the distributed ledger. Advantageously, requiring that the portion of the nodes participate in consensus while all nodes are operable to participate in consensus means that authority to modify the ledger is not allocated to one node or even a group of nodes but rather is equally distributed across all of the nodes in the system. In one embodiment, a node that participates in consensus is rewarded, e.g., with a digital token, in a process called mining.

The blockchain is a commonly used implementation of a distributed ledger and was described in Satoshi Nakamoto's whitepaper Bitcoin: A Peer-to-Peer Electronic Cash System, which was published in October 2008, and which is incorporated herein by reference in its entirety. In the blockchain, additional data is added to the ledger in the form of a block. Each block is linked to its preceding block with a cryptographic hash, which is a one-way mapping function of the data in the preceding block that cannot practically be computed in reverse. In one embodiment, a timestamp is also included in the hash. The computation of the cryptographic hash based on data in a preceding block is a computationally intensive task that could not practically be conducted as a mental process. The use of cryptographic hashes means that each block is sequentially related to the block before it and the block after it, making the chain as a whole immutable. Data in a block in a preferred embodiment cannot be retroactively altered after it is added to the chain because doing so changes the associated hash, which affects all subsequent blocks in the chain and which breaks the mapping of the preceding block. The blockchain is an improvement on existing methods of data storage because it connects blocks of data in an immutable fashion. Additionally, the blockchain is then replicated and synchronized across all nodes in the system, ensuring a distributed ledger. Any attempted changes to the blockchain are propagated across a decentralized network, which increases the responsiveness of the system to detect and eliminate fraudulent behavior compared to non-distributed data storage systems. The blockchain and the distributed ledger solve problems inherent to computer networking technology by providing a secure and decentralized way of storing data that is immutable and has high fault tolerance. The distributed ledger stores digital data and is thus inextricably tied to computer technology. Additional information about the blockchain is included in The Business of Blockchain by William Mougavar published in April 2016, which is incorporated herein by reference in its entirety.

In one embodiment, the data added to the distributed ledger of the present invention include digital signatures. A digital signature links a piece of data (e.g., a block) to a digital identity (e.g., a user account). In one embodiment, the digital signature is created using a cryptographic hash and at least one private key for a user. The content of the piece of data is used to produce a cryptographic hash. The cryptographic hash and the at least one private key are used to create the digital signature using a signature algorithm. The digital signature is only operable to be created using a private key. However, the digital signature is operable to be decoded and/or verified using a public key also corresponding to the user. The separation of public keys and private keys means that external parties can verify a digital signature of a user using a public key but cannot replicate the digital signature since they do not have a private key. Digital signatures are not merely electronic analogs of traditional physical signatures. Physical signatures are easily accessible and easily replicable by hand. In addition, there is no standard algorithm to verify a physical signature except comparing a first signature with a second signature from the same person via visual inspection, which is not always possible. In one embodiment, the digital signatures are created using the data that is being linked to the digital identity whereas physical signatures are only related to the identity of the signer and are agnostic of what is being signed. Furthermore, digital signatures are transformed into a cryptographic hash using a private key, which is a proof of identity of which there is no physical or pre-electronic analog. Digital signatures, and cryptographic hashes in general, are of sufficient data size and complexity to not be understood by human mental work, let alone verified through the use of keys and corresponding algorithms by human mental work. Therefore, creating, decoding, and/or verifying digital signatures with the human mind is highly impractical.

Public, private, consortium, and hybrid blockchains are compatible with the present invention. In one embodiment, the blockchain system used by the present invention includes sidechains wherein the sidechains run parallel to a primary chain. Implementations of distributed ledger and/or blockchain technology including, but not limited to, BITCOIN, ETHEREUM, HASHGRAPH, BINANCE, FLOW, TRON, TEZOS, COSMOS, and/or RIPPLE are compatible with the present invention. In one embodiment, the platform includes at least one acyclic graph ledger (e.g., at least one tangle and/or at least one hashgraph). In one embodiment, the platform includes at least one quantum computing ledger.

In one embodiment, the present invention further includes the use of at least one smart contract, wherein a smart contract includes a set of automatically executable steps and/or instructions that are dependent on agreed-upon terms. The smart contract includes information including, but not limited to, at least one contracting party, at least one contract address, contract data, and/or at least one contract term. In one embodiment, the at least one smart contract is deployed on a blockchain such that the at least one smart contract is also stored on a distributed node infrastructure. In one embodiment, the terms of the at least one smart contract are dependent on changes to the blockchain. For example, a provision of the at least one smart contract executes when a new block is added to the blockchain that meets the terms of the at least one smart contract. The smart contract is preferably executed automatically when the new block is added to the blockchain. In one embodiment, a first smart contract is operable to invoke a second smart contract when executed. A smart contract is operable to capture and store state information about the current state of the blockchain and/or the distributed ledger at any point in time. Advantageously, a smart contract is more transparent than traditional coded contracts because it is stored on a distributed ledger. Additionally, all executions of the smart contract are immutably stored and accessible on the distributed ledger, which is an improvement over non-distributed, stateless coded contracts. In one embodiment, the state information is also stored on a distributed ledger.

Figure 12:
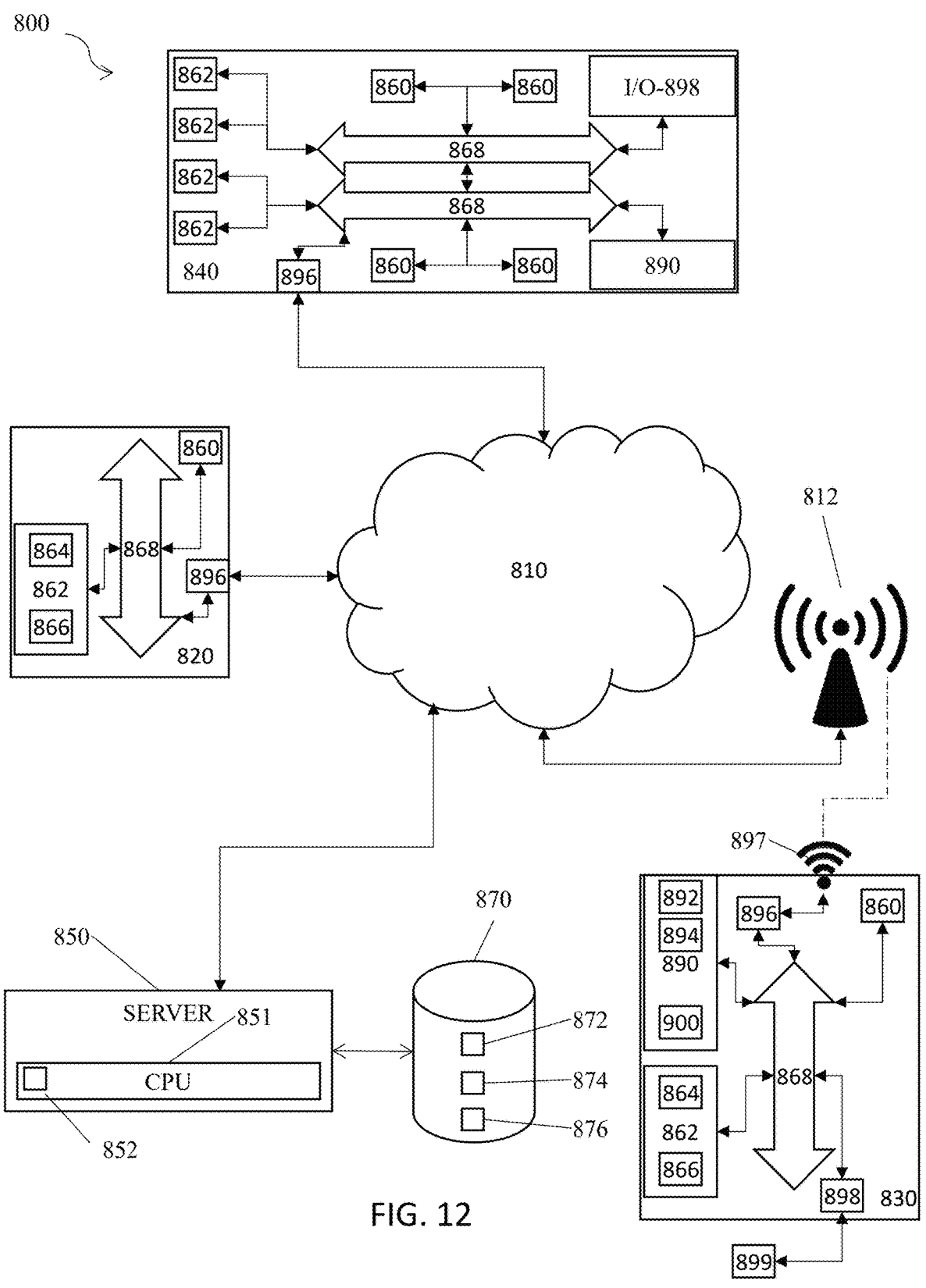
FIG. 12 is a schematic diagram of a system of the present invention.

FIG. 12 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 12, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 12, is operable to include other components that are not explicitly shown in FIG. 12, or is operable to utilize an architecture completely different than that shown in FIG. 12. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for audio authentication and identity verification, comprising:
    emitting an inaudible audio signature, wherein the inaudible audio signature includes a unique identifier, a time, a date, and a set of location coordinates;
    modulating the inaudible audio signature using one or more modulation schemes selected from amplitude modulation, frequency modulation, phase modulation, pulse-duration modulation, frequency-shift keying (FSK), phase-shift keying (PSK), or any combination thereof;
    encoding the inaudible audio signature within an audio content by overlaying the inaudible audio signature as at least one carrier at a lane-center frequency or as a set of carriers within a designated band of the audio content, wherein a payload encodes at least one of the unique identifier, the time, the date, or the set of location coordinates as a direct alphanumeric symbol mapped to at least one tone and/or at least one pulse duration;
    splitting the encoded audio content into at least two complementary bit segments, storing one of the at least two complementary bit segments on a device, and storing one of the at least two complementary bit segments in a cloud database;
    decrypting, via a decryption key, the at least two complementary bit segments; and
    recording a decryption event on an immutable ledger.

2. The method of claim 1, further comprising shifting the inaudible audio signature across multiple sub-bands within the full 0 Hz-124 kHz spectrum.

3. The method of claim 1, wherein the inaudible audio signature further includes a date-of-birth.

4. The method of claim 1, further comprising storing the inaudible audio signature as uncompressed audio as a high-resolution WAV file at 48 kHz or higher.

5. The method of claim 1, further comprising concealing the inaudible audio signature by applying acoustic dithering, noise shaping, and randomized scheduling to the inaudible audio signature.

6. The method of claim 1, further comprising mapping the unique identifier directly to acoustic symbols, including, to the at least one tone and/or the at least one pulse duration without hashing.

7. A system for audio authentication and identity verification, comprising:
    a near-field communication (NFC)-enabled piezoelectric emitter device operable to playback or emit an inaudible audio signature, wherein the inaudible audio signature includes a unique identifier, a time, a date, and a set of location coordinates; and
    a dual custody and shared key privacy architecture;
    wherein the system is operable to modulate the inaudible audio signature using one or more modulation schemes selected from amplitude modulation, frequency modulation, phase modulation, pulse-duration modulation, frequency-shift keying (FSK), phase-shift keying (PSK), or any combination thereof,
    wherein an audio content is encoded with the inaudible audio signature by overlaying the inaudible audio signature as at least one carrier at a lane-center frequency or a set of carriers within a designated band of the audio content;
    wherein the dual custody and shared key privacy architecture is operable to split the encoded audio content into at least two complementary bit segments, wherein one of the at least two complementary bit segments is stored on a device, and wherein one of the at least two complementary bit segments is stored in a cloud database; and
    wherein the audio content is operable to be verified by verifying the identity, the time, the date, and the set of location coordinates of the encoded inaudible audio signature.

8. The system of claim 7, wherein the inaudible audio signature is stored as uncompressed audio including as a high-resolution WAV file at 48 kHz or higher.

9. The system of claim 7, further comprising an anti-jamming module operable to shift the inaudible audio signature across multiple sub-bands within the full 0 Hz-124 kHz spectrum.

10. The system of claim 7, wherein the inaudible audio signature further includes a date-of-birth.

11. The system of claim 7, wherein parity blocks and watermark fragments are embedded into the inaudible audio signature.

12. A method for audio authentication and identity verification, comprising:
    emitting an inaudible audio signature, wherein the inaudible audio signature includes a unique identifier, a time, a date, and a set of location coordinates;
    modulating the inaudible audio signature using one or more modulation schemes selected from amplitude modulation, frequency modulation, phase modulation, pulse-duration modulation, frequency-shift keying (FSK), phase-shift keying (PSK), or any combination thereof,
    encoding the inaudible audio signature within an audio content by overlaying the inaudible audio signature as a single-line carrier at lane-center frequency onto frequency carriers of the audio content into the ultrasonic band;

splitting the encoded audio content into at least two complementary bit segments, storing one of the at least two complementary bit segments on a device, and storing one of the at least two complementary bit segments in a cloud database;

decrypting, via a decryption key, the at least two complementary bit segments, wherein the decryption key is partitioned into five shards using a 3-of-5 Shamir secret sharing scheme;

recording a decryption event on an immutable ledger;

decoding the inaudible audio signature via at least one of band-pass filtering, time-frequency analysis including fast Fourier transform analysis, short-time Fourier transform analysis, or Goertzel analysis, envelope or correlation detection, phase retrieval, checksum validation, and/or error-detecting validation; and verifying the audio content by verifying the identity, time, date, and location data of the encoded inaudible audio signature.

13. The method of claim 12, wherein the time-frequency analysis further comprises a Goertzel filter bank tuned to expected carriers.

14. The method of claim 12, wherein the inaudible audio signature further includes a date-of-birth.

15. The method of claim 12, further comprising storing the inaudible audio signature as uncompressed audio at a high-resolution WAV file at 48 kHz or higher.

\* \* \* \* \*